US011449595B2

(12) United States Patent
Li et al.

(10) Patent No.: US 11,449,595 B2
(45) Date of Patent: *Sep. 20, 2022

(54) METHODS, SYSTEMS, AND PRODUCTS FOR AUTHENTICATION OF USERS

(71) Applicant: AT&T Intellectual Property I, L.P., Atlanta, GA (US)

(72) Inventors: Kevin A. Li, Chatham, NJ (US); Troy C. Meuninck, Newnan, GA (US); Robert Raymond Miller, II, Convent Station, NJ (US); James H. Pratt, Round Rock, TX (US); Horst J. Schroeter, Vero Beach, FL (US); Behzad Shahraray, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 89 days.

This patent is subject to a terminal disclaimer.

(21) Appl. No.: 17/023,689

(22) Filed: Sep. 17, 2020

(65) Prior Publication Data
US 2021/0004450 A1 Jan. 7, 2021

Related U.S. Application Data

(63) Continuation of application No. 15/863,874, filed on Jan. 6, 2018, now Pat. No. 10,810,299, which is a continuation of application No. 15/411,969, filed on Jan. 21, 2017, now Pat. No. 9,881,149, which is a continuation of application No. 14/737,656, filed on
(Continued)

(51) Int. Cl.
*G06F 21/36* (2013.01)
*G06F 21/32* (2013.01)
*H04L 9/40* (2022.01)

(52) U.S. Cl.
CPC .............. *G06F 21/36* (2013.01); *G06F 21/32* (2013.01); *H04L 63/08* (2013.01)

(58) Field of Classification Search
CPC .......... G06F 21/36; G06F 21/32; H04L 63/08
See application file for complete search history.

(56) References Cited

U.S. PATENT DOCUMENTS 6,421,453 B1 7/2002 Kanevsky et al.
7,729,520 B2 6/2010 Kempf
(Continued)

FOREIGN PATENT DOCUMENTS

WO 2012046099 A1 4/2012

OTHER PUBLICATIONS

Dunphy et al., "A Closer Look at Recognition-based Graphical Passwords on Mobile Devices," Jul. 2010, pp. 1-12.
(Continued)

*Primary Examiner* — Matthew Smithers
(74) *Attorney, Agent, or Firm* — Guntin & Gust, PLC; Mark Wilinski

(57) ABSTRACT

Methods, systems, and products authenticate users for access to devices, applications, and services. Skills of a user are learned over time, such that an electronic model of random subject matter may be generated. The user is prompted to interpret the random subject matter, such as with an electronic drawing. The user's interpretation is then compared to the electronic model of the random subject matter. If the user's interpretation matches the electronic model, the user may be authenticated.

20 Claims, 32 Drawing Sheets

Related U.S. Application Data

Jun. 12, 2015, now Pat. No. 9,584,500, which is a continuation of application No. 14/266,889, filed on May 1, 2014, now Pat. No. 9,083,694, which is a continuation of application No. 13/647,435, filed on Oct. 9, 2012, now Pat. No. 8,752,151.

(56) References Cited

U.S. PATENT DOCUMENTS

| | | | |
|---|---|---|---|
| 7,752,293 | B1 | 7/2010 | Bishop, Jr. et al. |
| 8,024,775 | B2 | 9/2011 | Xu et al. |
| 8,085,977 | B2 | 12/2011 | Roberts et al. |
| 8,117,458 | B2 | 2/2012 | Osborn, III et al. |
| 8,145,912 | B2 | 3/2012 | Mclean |
| 8,174,503 | B2 | 5/2012 | Chin |
| 8,217,912 | B2 | 7/2012 | Rofougaran |
| 8,650,636 | B2 | 2/2014 | Johnson et al. |
| 8,752,151 | B2 * | 6/2014 | Li ............ H04L 63/08 726/7 |
| 8,973,095 | B2 | 3/2015 | Smith |
| 9,083,694 | B2 * | 7/2015 | Li ............ G06F 21/32 |
| 9,430,634 | B1 * | 8/2016 | Dotan ............ H04L 63/083 |
| 9,584,500 | B2 * | 2/2017 | Li ............ H04L 63/08 |
| 9,881,149 | B2 | 1/2018 | Li et al. |
| 10,810,299 | B2 * | 10/2020 | Li ............ H04L 63/08 |
| 2006/0174339 | A1 | 8/2006 | Tao |
| 2006/0206717 | A1 | 9/2006 | Holt et al. |
| 2007/0036353 | A1 * | 2/2007 | Reznik ............ H04B 7/0434 380/30 |
| 2008/0113791 | A1 | 5/2008 | Williams et al. |
| 2008/0273764 | A1 * | 11/2008 | Scholl ............ G07C 9/37 382/118 |
| 2009/0138725 | A1 | 5/2009 | Madhvanath et al. |
| 2009/0210939 | A1 | 8/2009 | Xu et al. |
| 2010/0328032 | A1 | 12/2010 | Rofougaran |
| 2011/0078236 | A1 * | 3/2011 | Olsen, Jr. ............ H04L 63/104 709/203 |
| 2011/0295893 | A1 | 12/2011 | Wu |
| 2011/0302649 | A1 | 12/2011 | Foster et al. |
| 2012/0102551 | A1 | 4/2012 | Bidare |
| 2012/0204225 | A1 | 8/2012 | Cohen |
| 2012/0304284 | A1 | 11/2012 | Johnson et al. |
| 2013/0015946 | A1 | 1/2013 | Lau et al. |
| 2013/0061304 | A1 * | 3/2013 | Bruso ............ G06F 21/34 726/7 |
| 2013/0061305 | A1 * | 3/2013 | Bruso ............ G06F 21/34 726/19 |
| 2013/0159939 | A1 * | 6/2013 | Krishnamurthi ...... G06F 3/0304 715/863 |
| 2014/0071041 | A1 | 3/2014 | Fujimaki |
| 2014/0075549 | A1 | 3/2014 | Lewis et al. |
| 2015/0319159 | A1 | 11/2015 | Abdul Hameed Khan |
| 2016/0021238 | A1 * | 1/2016 | Abramson ............ H04W 4/80 455/418 |
| 2016/0117473 | A1 * | 4/2016 | Hanina ............ G06F 16/24573 705/2 |

OTHER PUBLICATIONS

Goldberg et al., "Doodling Our Way to Better Authentication," Apr. 2002, CHI, pp. 868-869.

Oka et al., "Scribble-a-Secret; Similarity-Based Password Authentication Using Sketches," 2008, IEEE, pp. 1-4.

* cited by examiner

METHODS, SYSTEMS, AND PRODUCTS FOR AUTHENTICATION OF USERS

CROSS-REFERENCE TO RELATED APPLICATIONS

This application is a continuation of U.S. patent application Ser. No. 15/863,874 filed on Jan. 6, 2018, which is a continuation of U.S. patent application Ser. No. 15/411,969 filed on Jan. 21, 2017 (now U.S. Pat. No. 9,881,149), which is a continuation of U.S. patent application Ser. No. 14/737,656 filed on Jun. 12, 2015 (now U.S. Pat. No. 9,584,500), which is a continuation of U.S. patent application Ser. No. 14/266,889 filed on May 1, 2014 (now U.S. Pat. No. 9,083,694), which is a continuation of U.S. patent application Ser. No. 13/647,435 filed on Oct. 9, 2012 (now U.S. Pat. No. 8,752,151). All sections of the aforementioned applications and patents are incorporated herein by reference in their entirety.

BACKGROUND

Authentication is common. People often input a username and password to access a device, website, or service. As we are all too aware, though, text-based authentication is vulnerable to hackers.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
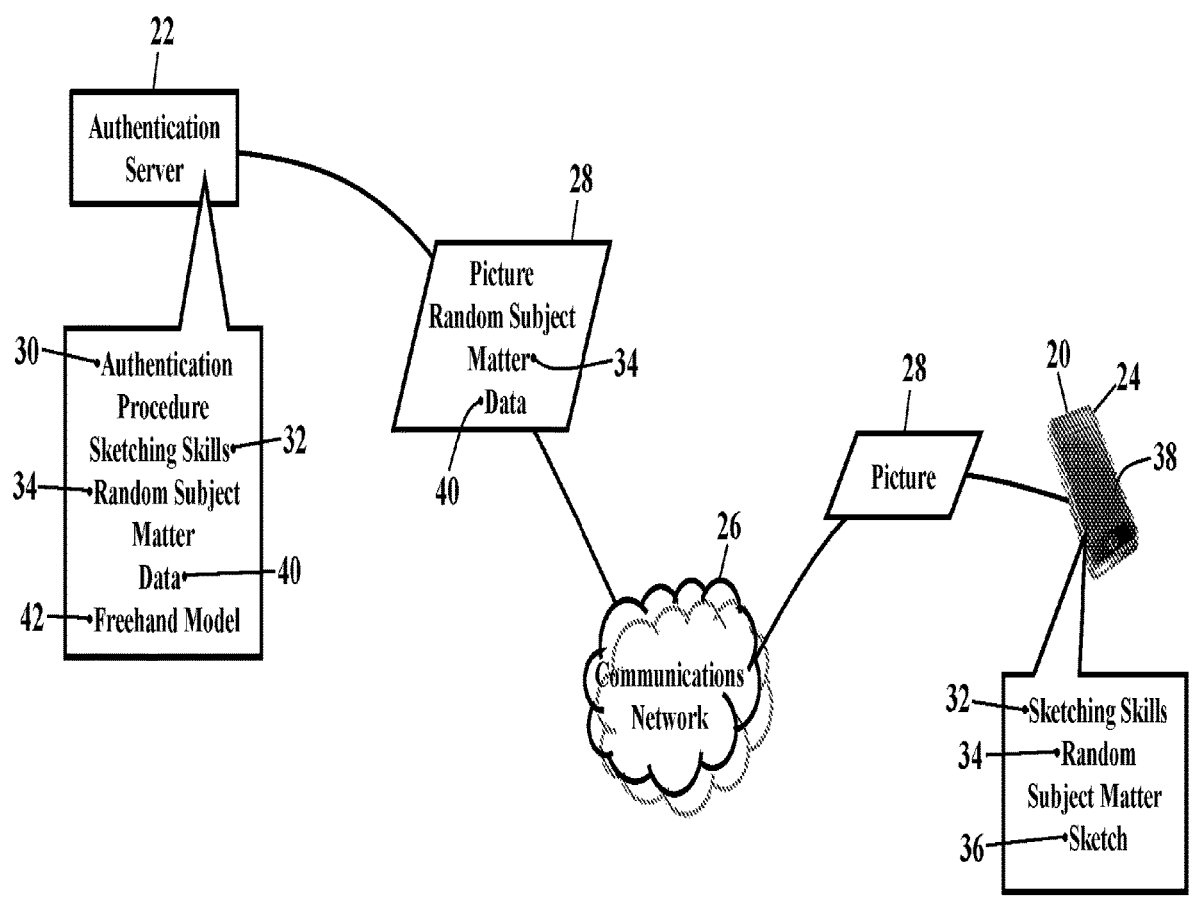
FIG. 1 is a simplified schematic illustrating an environment in which exemplary embodiments may be implemented.

FIG. 1 is a simplified schematic illustrating an environment in which exemplary embodiments may be implemented. FIG. 1 illustrates authentication of a client device 20 to an authentication server 22. The client device 20, for simplicity, is illustrated as a smart phone 24. The client device 20 and the authentication server 22 may communicate over a communications network 26. A user of the client device 20 wishes to access some service, application, or features for which authentication is needed. While the user may input a username and password, exemplary embodiments utilize a graphical, sketch-based authentication procedure. That is, the user of the client device 20 is prompted to draw or sketch a picture 28. The picture 28 may be sent to the authentication server 22. The authentication server 22 may then inspect the picture 28 drawn by the user of the client device 20. If the picture 28 drawn by the user satisfies an authentication procedure 30, then the user is authenticated by the authentication server 22. The user, in other words, is permitted to access the service, application, or features for which authentication is needed. If the picture 28 does not satisfy the authentication procedure 30, then the user may be denied access.

Here, authentication utilizes the sketching skills 32 of the user. When the user of the client device 20 wishes to authenticate, the user is instructed to draw random subject matter 34. The random subject matter 34 may be selected by the authentication server 22 and/or by the client device 20. Regardless, the user then draws a sketch 36 of the random subject matter 34. The user, for example, uses their finger, fingernail, or a stylus to draw the sketch 36 on a touch screen 38 of the smart phone 24. The client device 20 sends data 40 describing the sketch 36 to the authentication server 22.

The data 40 may then be compared to a freehand model 42. The freehand model 42 is an electronic recreation of the random subject matter 34 generated from the sketching skills 32 associated with the user. The freehand model 42, in other words, predicts what the random subject matter 34 should look like, using the user's known sketching skills 32. As the user interacts with the authentication server 22, the authentication server 22 learns the user's sketching skills 32 over time. So, the user's sketch 36 (as represented by the data 40) is compared to the freehand model 42 predicted by the user's known sketching skills 32. If the data 40 matches the freehand model 42 predicted from the user's known sketching skills 32, then the user may be authenticated. If data 40 does not match the freehand model 42, then authentication may fail.

Exemplary embodiments thus eliminate cumbersome, conventional authentication schemes. Users no longer need to remember cumbersome passwords. Security concerns are greatly reduced, as the user need not fear nefarious use of stolen passwords. Occurrences of identity theft are thus reduced.

Figure 2:
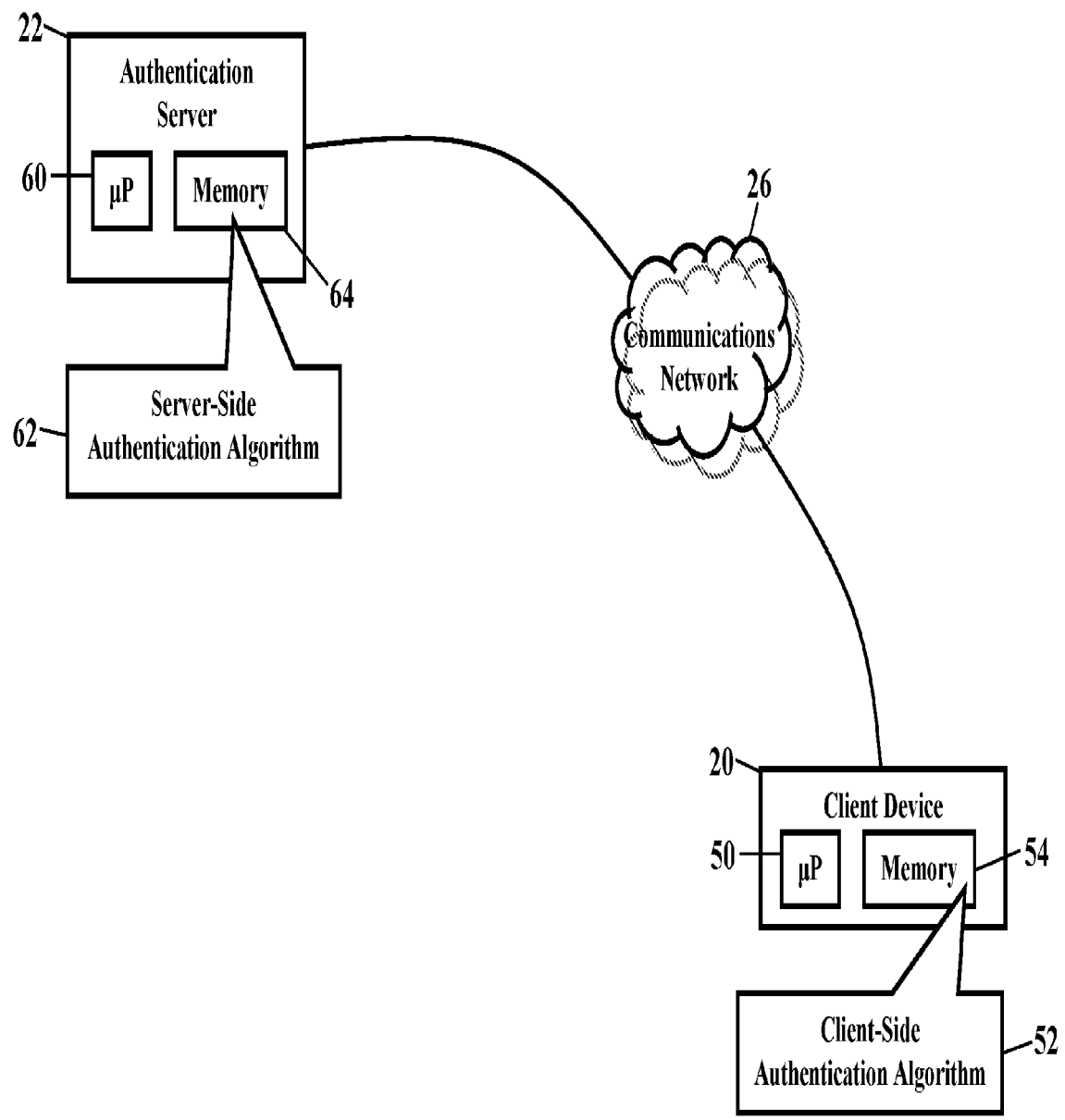
FIG. 2 is a more detailed schematic illustrating an operating environment, according to exemplary embodiments.

FIG. 2 is a more detailed schematic illustrating an operating environment, according to exemplary embodiments. The user's client device 20 may have a processor 50 (e.g., "μP"), application specific integrated circuit (ASIC), or other component that executes a client-side authentication algorithm 52 stored in a local memory 54. The authentication server 22 may also have a processor 60 (e.g., "μP"), application specific integrated circuit (ASIC), or other component that executes a server-side authentication algorithm 62 stored in a local memory 64. The client-side authentication algorithm 52 and/or the server-side authentication algorithm 62 include instructions, code, and/or programs that authenticate the user of the client device 20. The user may be authenticated solely by either the client-side authentication algorithm 52 or the server-side authentication algorithm 62. However, the client-side authentication algorithm 52 and the server-side authentication algorithm 62 may cooperate in a client-server relationship to authenticate the user.

Exemplary embodiments may be applied regardless of networking environment. As the above paragraphs mentioned, the communications network 26 may be a wireless network having cellular, WI-FI®, and/or BLUETOOTH® capability. The communications network 26, however, may be a cable network operating in the radio-frequency domain and/or the Internet Protocol (IP) domain. The communications network 26, however, may also include a distributed computing network, such as the Internet (sometimes alternatively known as the "World Wide Web"), an intranet, a local-area network (LAN), and/or a wide-area network (WAN). The communications network 26 may include coaxial cables, copper wires, fiber optic lines, and/or hybrid-coaxial lines. The communications network 26 may even include wireless portions utilizing any portion of the electromagnetic spectrum and any signaling standard (such as the IEEE 802 family of standards, GSM/CDMA/TDMA or any cellular standard, and/or the ISM band). The communications network 26 may even include powerline portions, in which signals are communicated via electrical wiring. The concepts described herein may be applied to any wireless/wireline communications network, regardless of physical componentry, physical configuration, or communications standard(s).

FIGS. 3-6 are schematics illustrating a learning session 70, according to exemplary embodiments. Before the user can be authenticated, exemplary embodiments may need to learn the user's sketching skills 32. If the authentication server 22 is going to predict the user's authentication sketches, the authentication server 22 must learn the user's sketching skills 32. During the learning session 70, the user may be repetitively prompted to draw one, several, or many pictures of different scenes, places, and/or things. The user, for example, may first be asked to draw a sunset. The user then submits the sketch 36 of their interpretation of the sunset. The user may then be instructed to draw a bicycle, then a flowerpot, then a lamppost. For each prompt the user sketches their interpretation of the requested task. This prompt-and-sketch routine is repeated as long as necessary until the sketching skills 32 of the user are learned.

Figure 3:
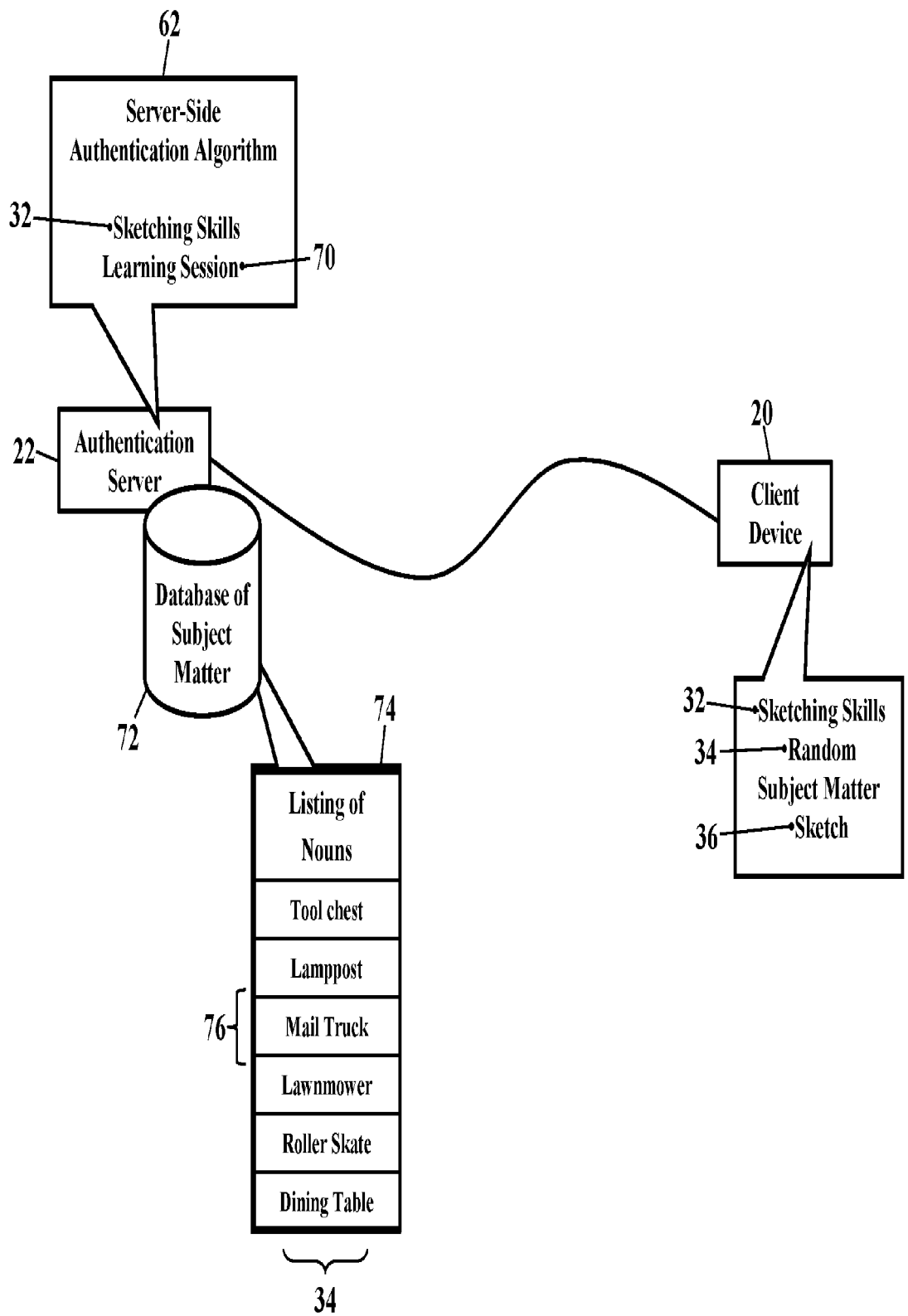
FIGS. 3-6 are schematics illustrating a learning session, according to exemplary embodiments.

FIG. 3 thus illustrates the learning session 70. The authentication server 22 accesses a database 72 of subject matter. The database 72 of subject matter stores one or more listings of subject matter for authentication purposes. The database 72 of subject matter is illustrated as being locally stored in the authentication server 22, but the database 72 of subject matter may be remotely stored and accessed from any network location. Regardless, FIG. 3 illustrates the database 72 of subject matter as a listing 74 of nouns. The listing 74 of nouns may be any listing of persons, places, and/or things that the authenticating user may be required to draw. The listing 74 of nouns, for example, may include "bowl," "chair," "fire hydrant," "globe," "tree," and "truck." While FIG. 3 only illustrates several entries in the listing 74 of nouns, in practice the listing 74 of nouns may have hundreds or thousands of entries. The server-side authentication algorithm 62 instructs the processor (illustrated as reference numeral 60 in FIG. 2) to query the database 72 of subject matter to obtain the random subject matter 34. The database 72 of subject matter randomly selects an entry 76 from the listing 74 of nouns. The database 72 of subject matter then responds with the random subject matter 34.

Figure 4:
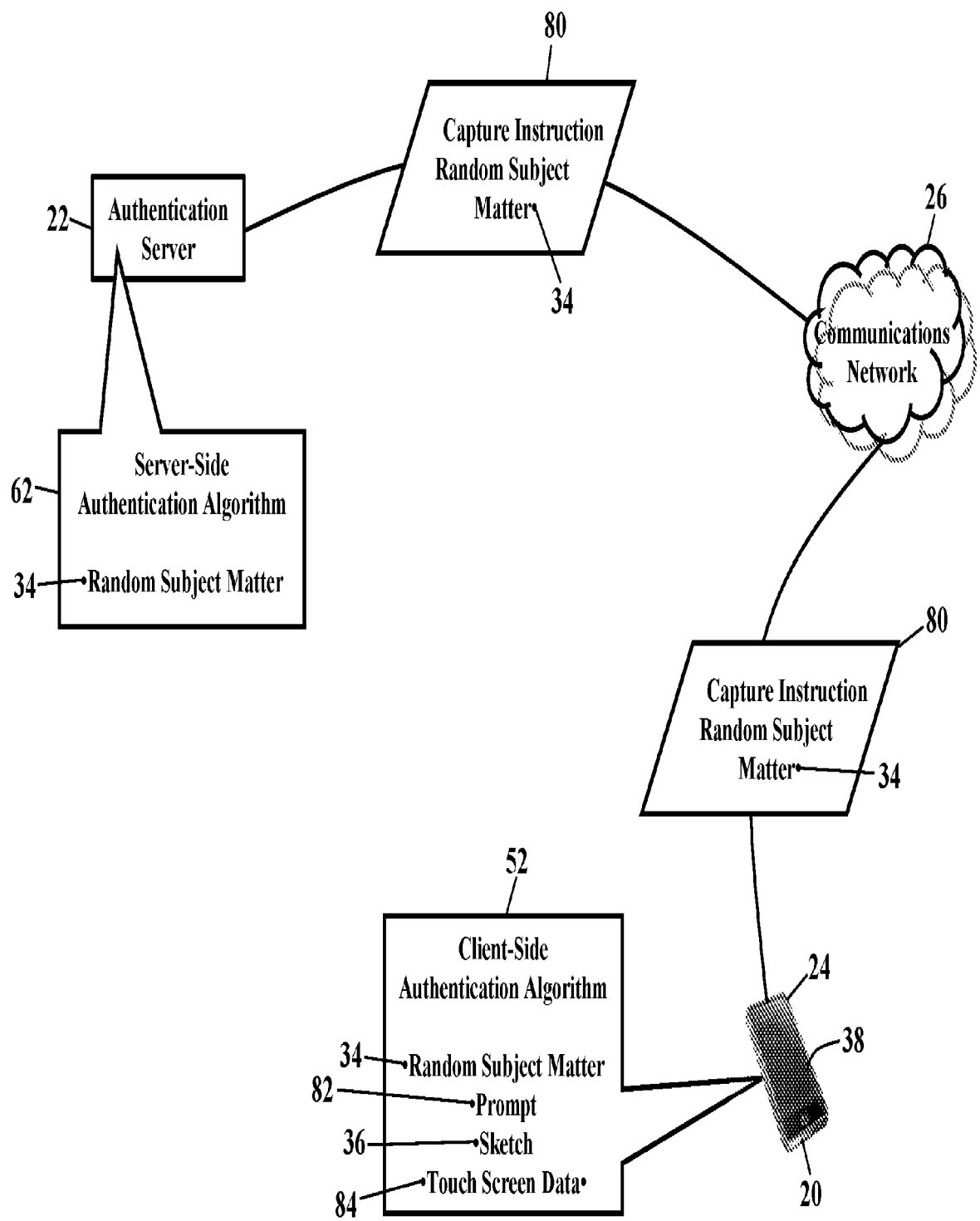

FIG. 4 illustrates prompts for the random subject matter 34. Once the authentication server 22 receives the random subject matter 34, the user is prompted to draw the random subject matter 34. The server-side authentication algorithm 62 sends a capture instruction 80 to the user's client device 20. The capture instruction 80 routes along the communications network 26 to a network address associated with the user's client device 20. When the capture instruction 80 is received, the client-side authentication algorithm 52 inspects the capture instruction 80 for the random subject matter 34. The client-side authentication algorithm 52 then instructs the processor (illustrated as reference numeral 50 in FIG. 2) to generate a prompt 82 to draw the random subject matter 34. The prompt 82, for example, is produced by the touch screen 38 on the user's smart phone 24. The user then proceeds to draw the random subject matter 34 using a fingernail, stylus, or other instrument. The client-side authentication algorithm 52 captures the user's sketch 36 of the random subject matter 34. In this example, the user's sketch 36 of the random subject matter 34 is captured as touch screen data 84 by the user's smart phone 24.

Figure 5:
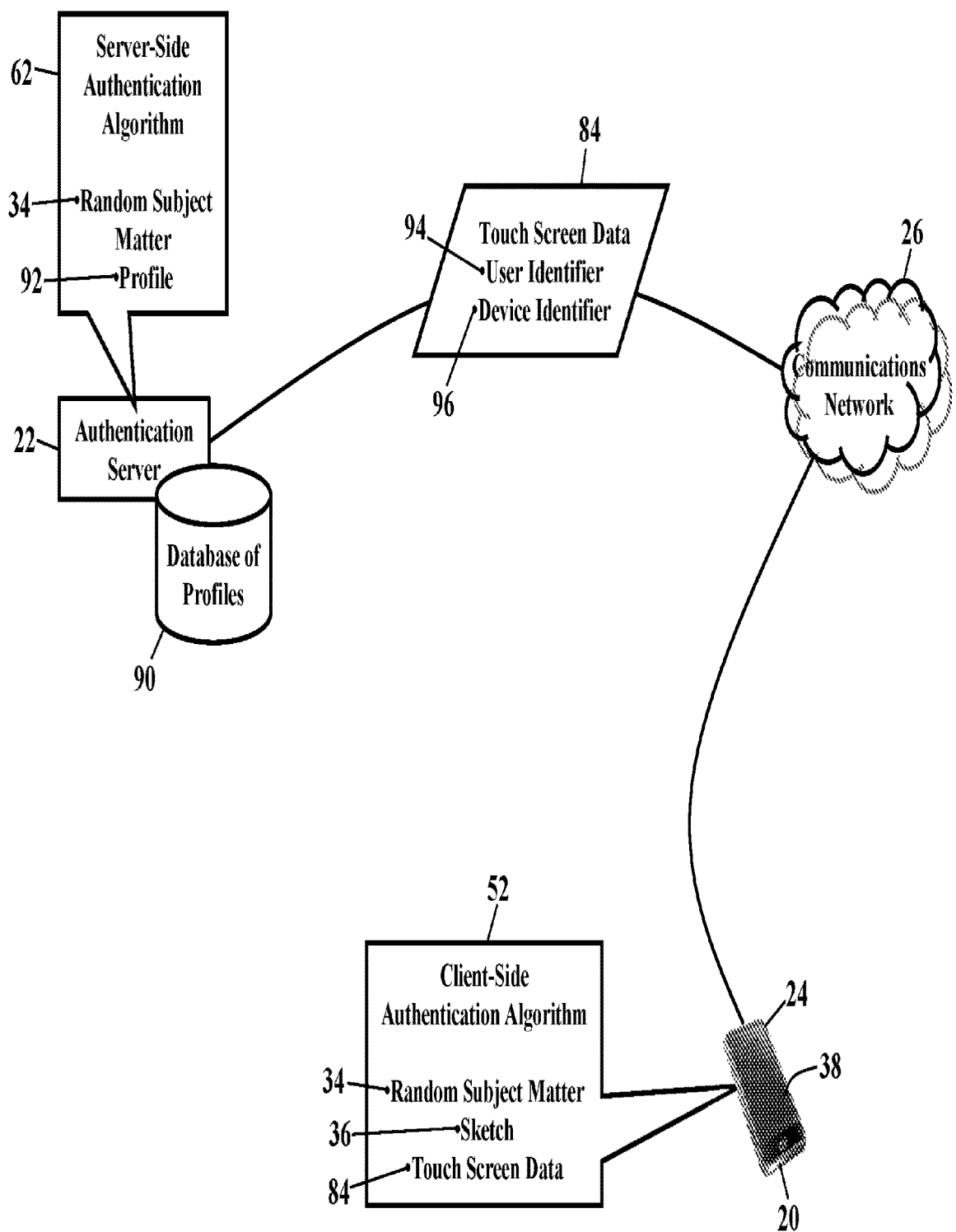

FIG. 5 illustrates a database 90 of profiles. Once the user's sketch 36 of the random subject matter 34 is captured, the touch screen data 84 is sent to the authentication server 22. The client-side authentication algorithm 52 instructs the user's client device 20 to send the touch screen data 84 to the network address associated with the authentication server 22. When the authentication server 22 receives the touch screen data 84, the server-side authentication algorithm 62 may stores the touch screen data 84 in a profile 92. The profile 92 may store the touch screen data 84 in association with a user identifier 94 and/or a device identifier 96. The user identifier 94 may be any information that uniquely identifies the user, such as a username. The user identifier may also be a biometric fingerprint, a facial scan, a retina scan, or any other physical recognition. The device identifier 96 may be any information that uniquely identifies the client device 20, such as a machine address, network address, or serial number. The server-side authentication algorithm 62 may also associate the touch screen data 84 to the random subject matter 34. The server-side authentication algorithm 62, in other words, may now maintain associations between the random subject matter 34, the user's corresponding sketch 36 (as represented by the touch screen data 84), the user identifier 94, and/or the device identifier 96.

Figure 6:
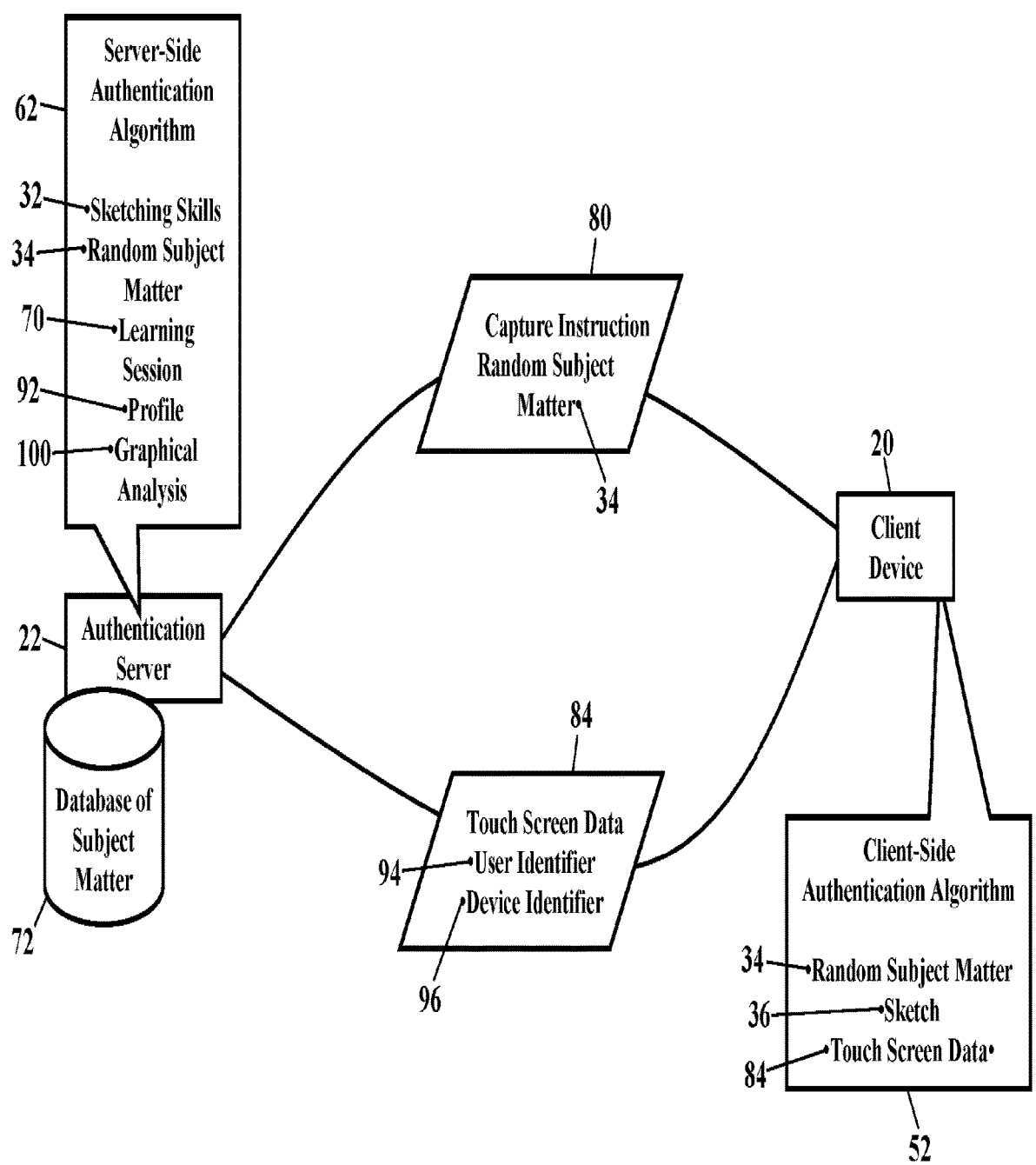

FIG. 6 thus illustrates the cyclic learning session 70. The server-side authentication algorithm 62 may repeatedly retrieve different random subject matter 34 from the database 72 of subject matter. The capture instruction 80 is sent to the client device 20. The user is prompted to draw each random subject matter 34. Each of the user's sketches 36 is captured (such as by the touch screen data 84) and sent back to the authentication server 22. The user's sketch 36 may then be associated with the random subject matter 34.

With several iterations the server-side authentication algorithm 62 begins to acquire the user's sketching skills 32. As each sketch 36 is obtained, the server-side authentication algorithm 62 builds a repository of the different random subject matter 34 and the user's corresponding sketches 36 (as represented by the touch screen data 84). The server-side authentication algorithm 62 performs a graphical analysis 100 to compare the different random subject matter 34 and the user's responsive sketches 36. Over time the server-side authentication algorithm 62 acquires confidence in learning the user's sketching skills 32. The server-side authentication algorithm 62 thus gains enough information to predict how the user will sketch any subject matter. That is, whatever random subject matter 34 that the user is instructed to draw, the true user's response can be predicted from the sketching skills 32. Indeed, over time with several or many iterations, the graphical analysis 100 yields a highly accurate estimation of the user's sketching skills 32.

The graphical analysis 100 may utilize any comparison. There are many schemes that compare the different random subject matter 34 and the user's responsive sketches 36. Exemplary embodiments, for example, may compare slopes and arcs of lines to ascertain the user's sketching skills 32. Right-handed people, for example, draw images with different slants and arcs from left-handed people. When arcs and circles are drawn, different artists have different starting and ending points. Linear velocities of lines and circles may also differ between users. Different users may have different measures of detail and/or complexity in their sketches 36. Different users utilize different depth and perspective in their respective sketches 36. The graphical analysis 100 may thus utilize any measurement and/or comparison to estimate the user's sketching skills 32.

Figure 7:
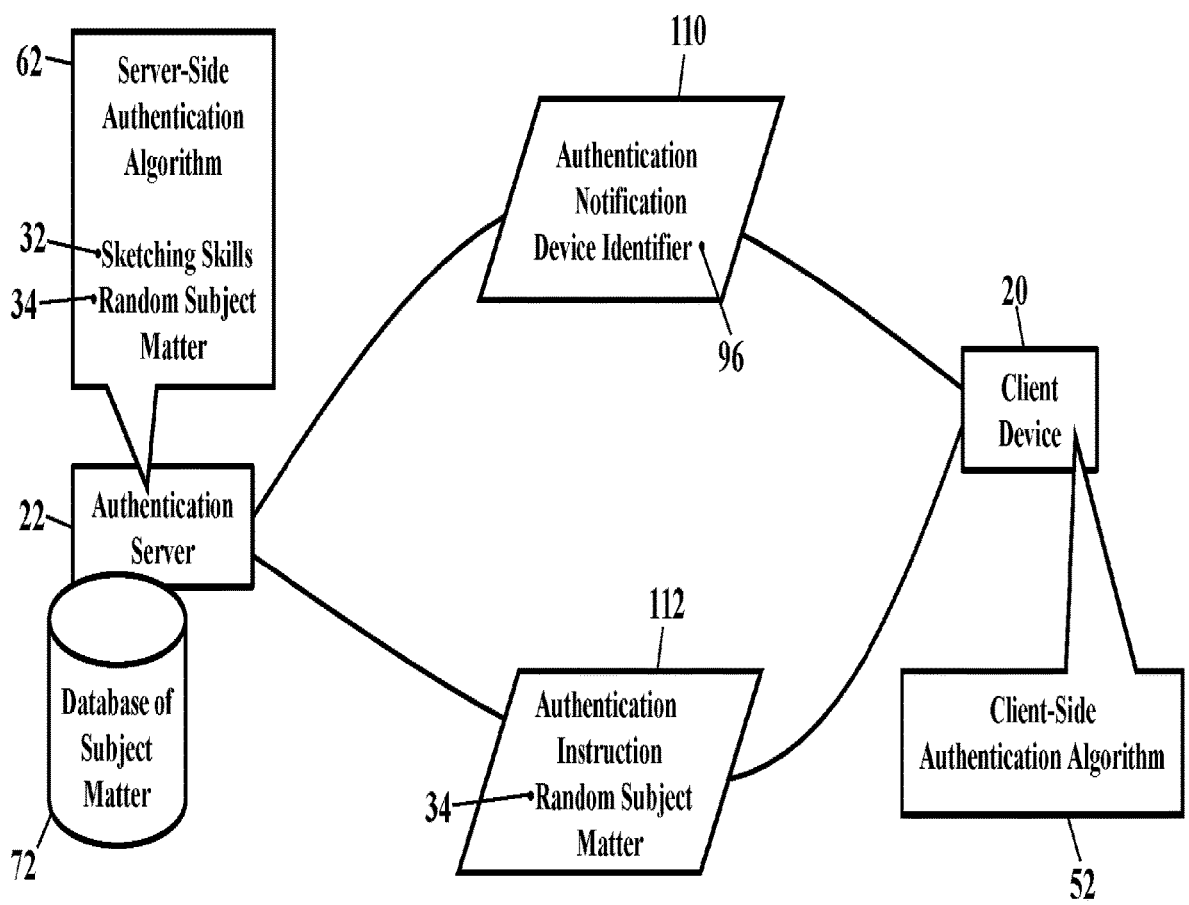
FIGS. 7-12 are schematics illustrating authentication based on models from skills, according to exemplary embodiments.

FIGS. 7-12 are schematics illustrating cloud-based authentication, according to exemplary embodiments. Now that the user's sketching skills 32 are learned, the user's sketching skills 32 may be applied to authentication requests. As FIG. 7 illustrates, when the user of the client device 20 wishes to authenticate, the client-side authentication algorithm 52 sends an authentication notification 110 to the authentication server 22. Here the authentication notification 110 identifies the device identifier 96 that wishes to authenticate. The device identifier 96 is any information that uniquely identifies the client device 20 wishing to authenticate. The authentication notification 110 routes via the communications network (illustrated as reference numeral 26 in FIG. 1) to the network address associated with the authentication server 22. When the authentication server 22 receives the authentication notification 110, the server-side authentication algorithm 62 is alerted to an authentication attempt from the client device 20. The server-side authentication algorithm 62 inspects the authentication notification 110 for the device identifier 96.

The random subject matter 34 is then selected. The server-side authentication algorithm 62 instructs the authentication server 22 to query the database 72 of subject matter for the random subject matter 34. The database 72 of subject matter then responds with the random subject matter 34. The server-side authentication algorithm 62 instructs the authentication server 22 to send an authentication instruction 112 to the client device 20. The authentication instruction 112 includes information that identifies the random subject matter 34 selected by the database 72 of subject matter. The authentication instruction 112 routes via the communications network 26 to the network address associated with the requesting client device 20.

Figure 8:
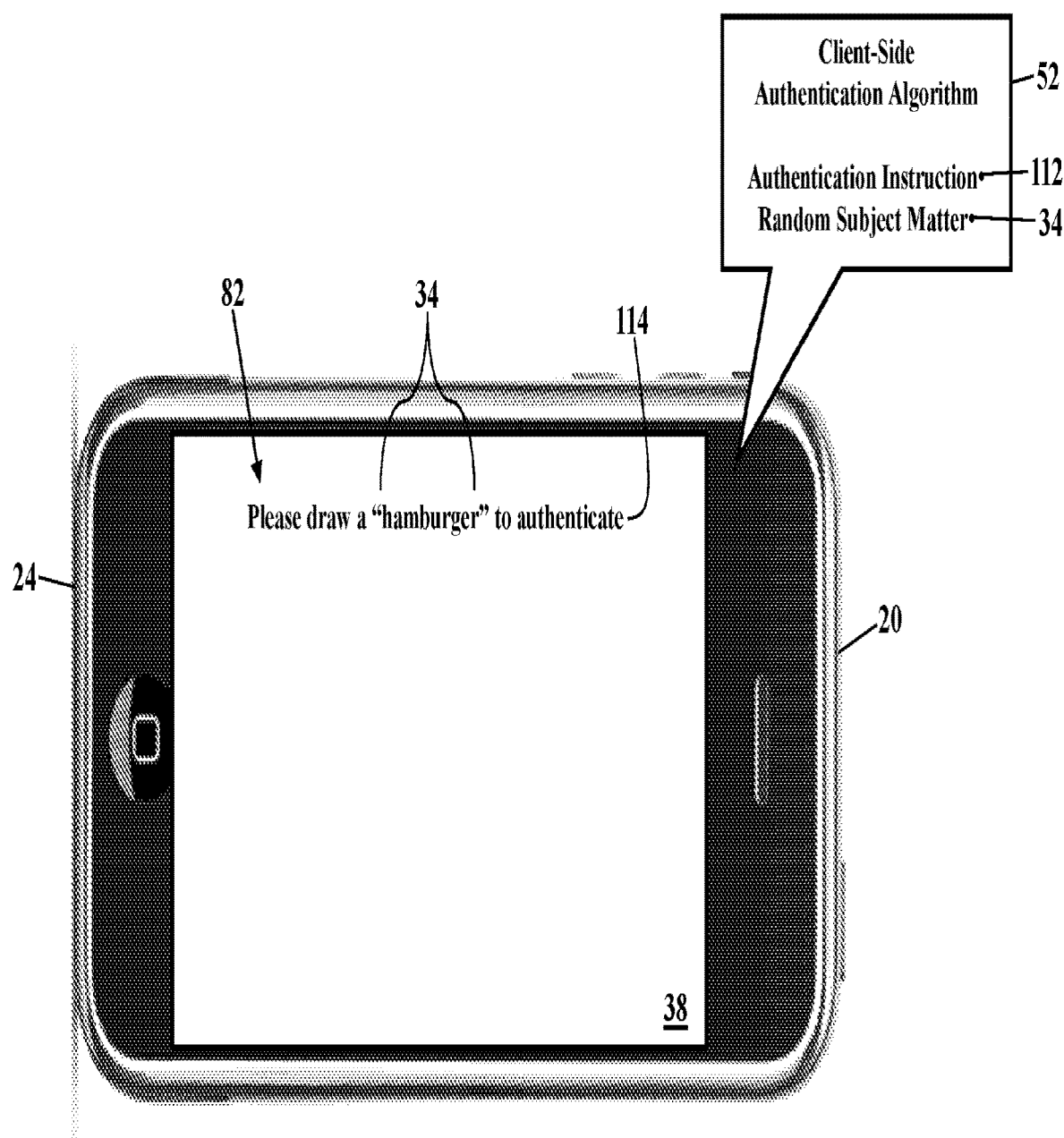

FIG. 8 illustrates the prompt 82 for the random subject matter 34. When the client device 20 receives the authentication instruction 112, the client-side authentication algorithm 52 inspects the authentication instruction 112 for the random subject matter 34. The client device 20 generates the prompt 82 to draw the random subject matter 34. FIG. 8 again illustrates the prompt 82 produced by the touch screen 38 on the user's smart phone 24. The prompt 82 visually presents a textual version 114 of the random subject matter 34 (such as "Please draw a hamburger to authenticate").

Figure 9:
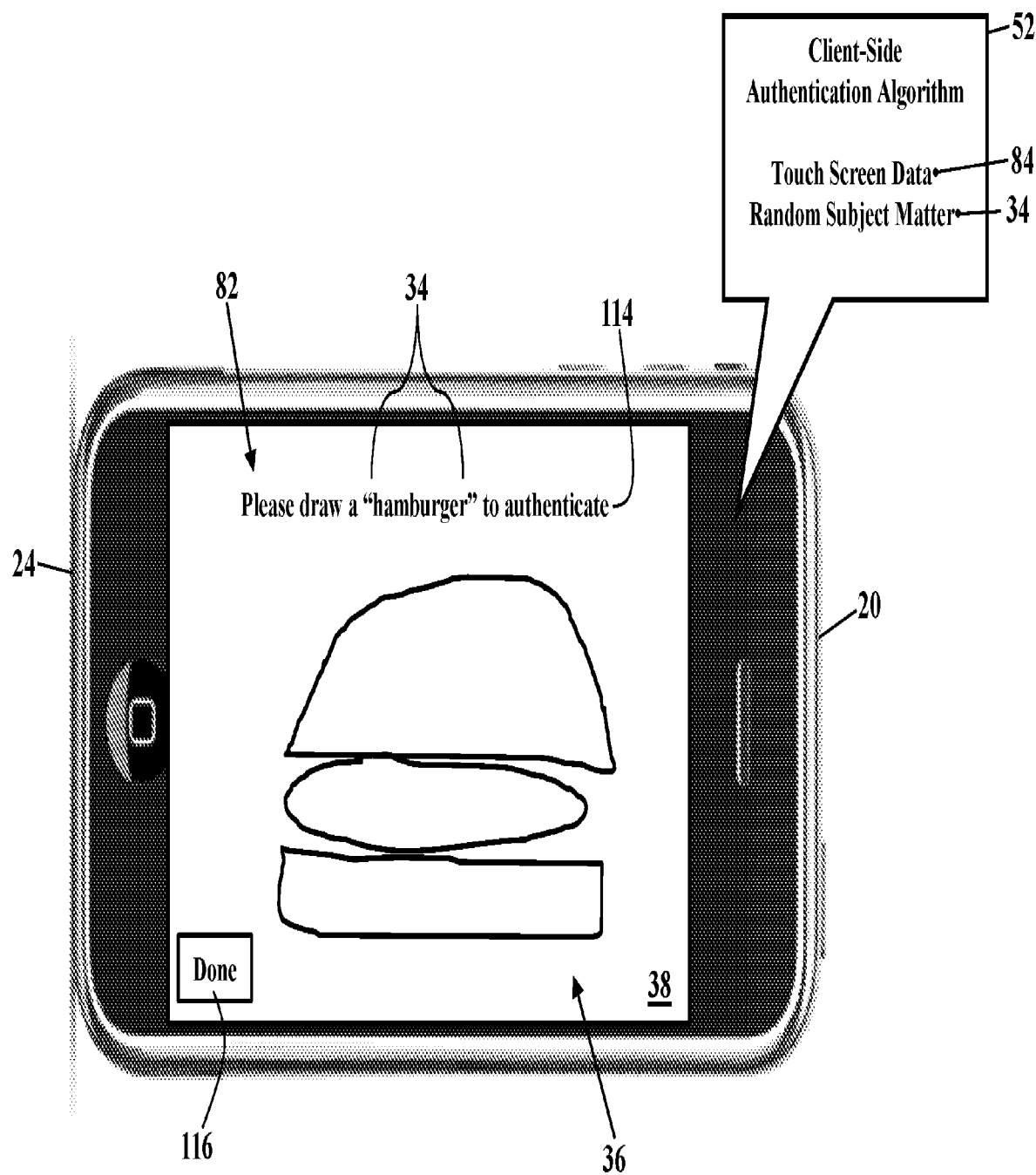

FIG. 9 illustrates a capture of the user's sketch 36. Once the prompt 82 is presented, the user begins drawing her version of the random subject matter 34. The user places her fingernail or stylus to the touch screen 38 and proceeds to draw her interpretation of the random subject matter 34. The client-side authentication algorithm 52 captures the user's sketch 36 as the touch screen data 84. When the user's sketch 36 is complete, the user may touch or click some icon (such as a "Done" graphical control 116). The user may also make a different input, such as a "double tap" on the touch screen 38. Regardless, the user informs the client-side authentication algorithm 52 that the sketch 36 is complete. The touch screen data 84 is then electronically captured and stored at least temporarily in the memory of the client device 20.

Exemplary embodiments may also guide the user. When the client device 20 generates the prompt 82 to draw the random subject matter 34, the prompt 82 may also help the user draw her interpretation of the random subject matter 34. Instead of merely displaying the textual version 114 of the random subject matter 34 (such as "Please draw a hamburger to authenticate"), exemplary embodiments may partially display some of the random subject matter 34. The prompt 82 would then instruct the user to complete the drawing. For example, if the random subject matter 34 is the "hamburger," then exemplary embodiments may graphically illustrate a bun on the touch screen 38. The prompt 82 may then instruct the user to complete the drawing, with or without revealing the random subject matter 34. The user may then draw, or fill in, the details that accompany her interpretation of the random subject matter 34. The client-side authentication algorithm 52 then captures the user's sketch 36 as the touch screen data 84.

Figure 10:
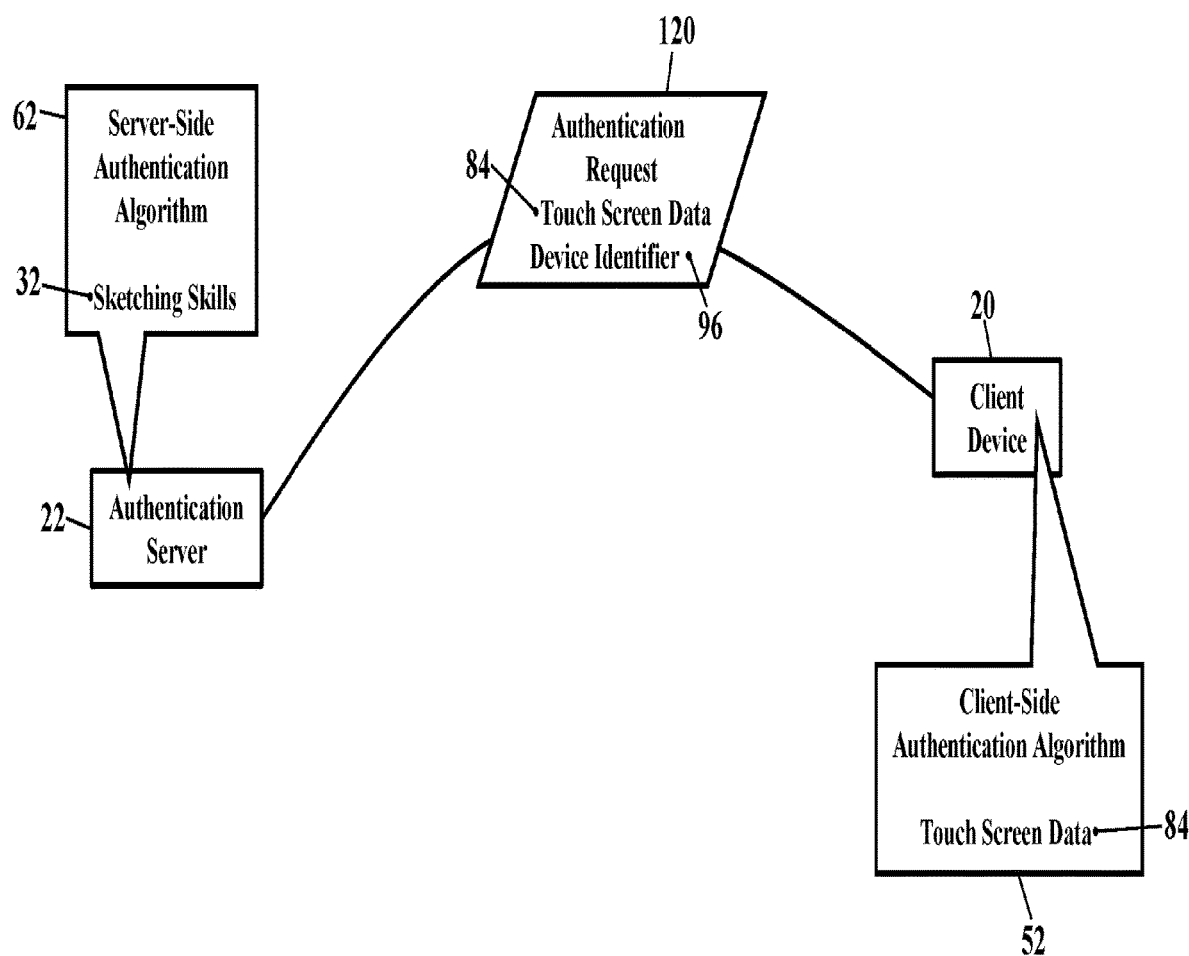

FIG. 10 illustrates an authentication request 120. Once the user's sketch 36 of the random subject matter 34 is captured, exemplary embodiments send the touch screen data 84 to the authentication server 22. The client-side authentication algorithm 52 instructs the client device 20 to send the authentication request 120. The authentication request 120 routes along the communications network (illustrated as reference numeral 26 in FIG. 1) to the network address associated with the authentication server 22. Here, though, the authentication request 120 may also include the touch screen data 84 and the device identifier 96 that wishes to authenticate. When the authentication server 22 receives the authentication request 120, the server-side authentication algorithm 62 may now authenticate the client device 20.

Figure 11:
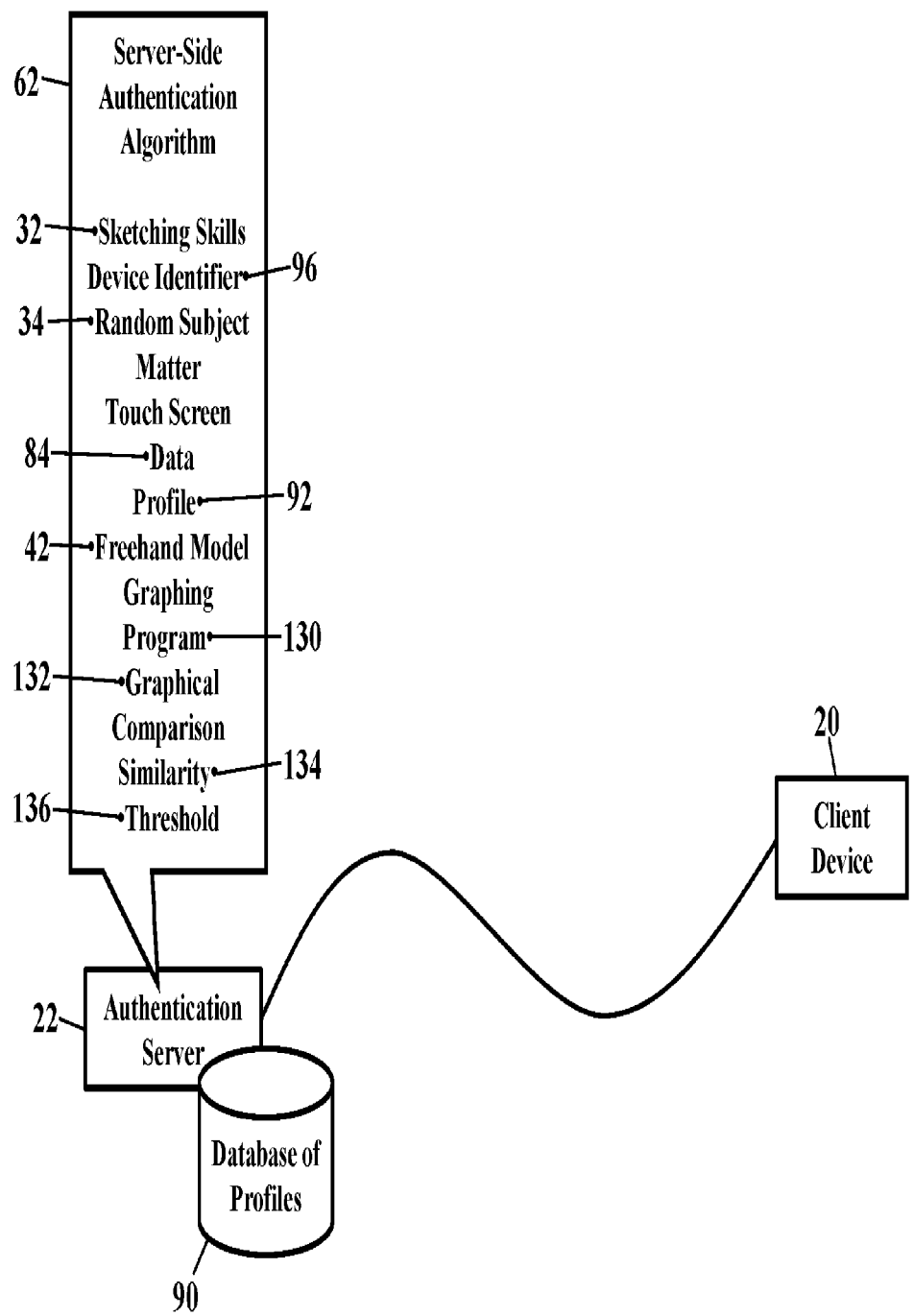

FIG. 11 illustrates the authentication. The server-side authentication algorithm 62 needs to determine if the user's sketch 36, represented by the touch screen data 84, is truly the artistic work expected from the client device 20 (e.g., the device identifier 96). So, before authentication can be performed, the server-side authentication algorithm 62 may predict what to graphically expect from the client device 20.

Exemplary embodiments may thus retrieve the user's sketching skills 32. Because the device identifier 96 identifies the client device 20 that wishes to authenticate, the server-side authentication algorithm 62 queries the database 90 of profiles for the device identifier 96 that wishes to authenticate. Here, though, the database 90 of profiles retrieves and responds with the sketching skills 32 associated with the device identifier 96.

The freehand model 42 may now be built. As earlier paragraphs explained, the sketching skills 32 describe the freehand sketching capabilities associated with the device identifier 96. The server-side authentication algorithm 62 may thus use the sketching skills 32 to generate the freehand model 42. The client-side authentication algorithm 52 may call or invoke a graphing program 130 that generates the freehand model 42 of the random subject matter 34, using the sketching skills 32 associated with the device identifier 96 wishing to authenticate. Exemplary embodiments, in other words, may generate an electronic representation of the same random subject matter 34, using the sketching skills 32 of the true person wishing to authenticate.

The user's sketch 36 may now be compared. The server-side authentication algorithm 62 compares the touch screen data 84 to the freehand model 42 generated from the sketching skills 32 of the true person wishing to authenticate. The server-side authentication algorithm 62 may use any graphical comparison 132 to determine a similarity 134 between the touch screen data 84 and the freehand model 42. If the user is truly who she purports to be, then her touch screen data 84 will sufficiently match the freehand model 42 generated from her own sketching skills 32. If her touch screen data 84 does not match the freehand model 42, then perhaps an imposter or rogue is attempting to authenticate.

The similarity 134 may thus be compared to a threshold 136. The similarity 134 may be any measurement of how closely the touch screen data 84 matches the freehand model 42. The graphical comparison 132, for example, may measure the similarity 134 between shapes and/or style. The graphical comparison 132 may additionally or alternatively measure a velocity of strokes, direction of strokes, and/or pressure or force of strokes. Starting locations, ending locations, and/or transition locations may be compared. However the similarity 134 is measured, the similarity 134 may be compared to the threshold 136. The threshold 136 may be any value, or values, that define or determine a minimum similarity 134 between the touch screen data 84 and the freehand model 42. The threshold 136, for example, may be an error function that generates a maximum error between the user's sketch 36 (using the touch screen data 84) and the freehand model 42 generated from the sketching skills 32. If the user is truly who she purports to be, then her touch screen data 84 will match, satisfy, or equal the freehand model 42 to within the threshold 136. If her touch screen data 84 does not match the freehand model 42, then the authentication may fail.

Figure 12:
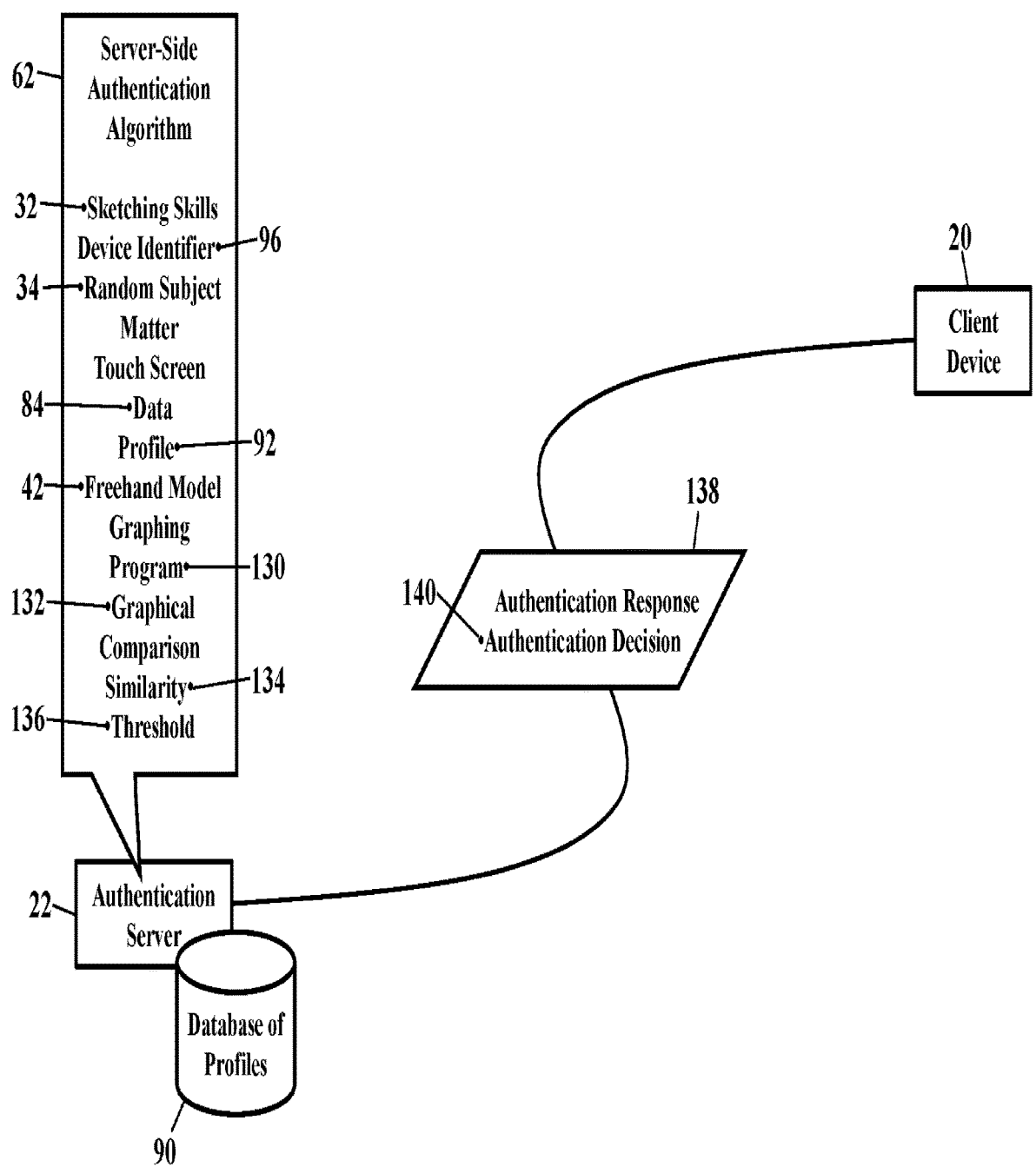
Figure 13:
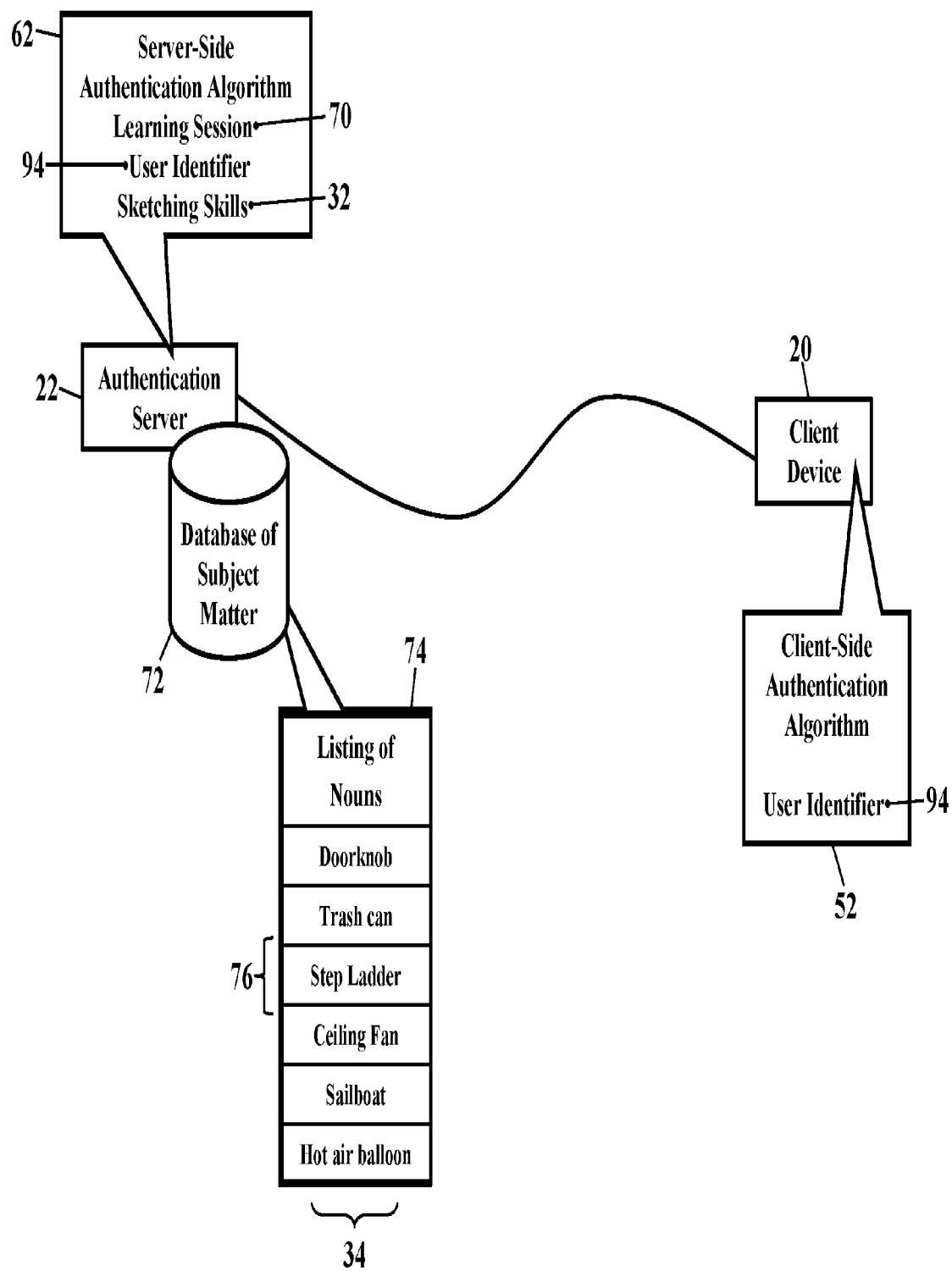
FIGS. 13-19 are more schematics illustrating authentication based on models from skills, according to exemplary embodiments.

FIG. 12 illustrates an authentication response 138. Once the graphical comparison 132 is complete, the server-side authentication algorithm 62 makes an authentication decision 140. If the similarity 134 satisfied the threshold 136, then the authentication decision 140 may be an affirmation or permission. If the similarity 134 fails to satisfy the threshold 136, then the authentication decision 140 may be a denial of access. The authentication decision 140 is sent from the authentication server 22 as the authentication response 138. The authentication response 138 communicates to the network address associated with the requesting client device 20. When the client device 20 receives the authentication response 138, the client-side authentication algorithm 52 also obtains the authentication decision 140. If the authentication decision 140 is the affirmation, then the client-side authentication algorithm 52 may access whatever permissions are available from the authentication server 22. If the client-side authentication algorithm 52 obtains the denial, though, then authentication failed.

FIGS. 13-19 are more schematics illustrating authentication, according to exemplary embodiments. Here authentication may be based on the user identifier 94 associated with the user. Many computers, tablets, and other client devices are shared by multiple users (such as members of a household). Exemplary embodiments may thus also authenticate different users that share the same client device 20. The current user of the client device 20 inputs their unique user identifier 94, such as a username. The user identifier 94, though, may also be a biometric identifier, such as a scan of a fingerprint, face, or retina.

The learning session 70, though, is repeated for each different user. Because the client device 20 may be shared, each different user may thus have some login credential, such as the user identifier 94. The user logs on to the client device 20 and completes the learning session 70 to recursively learn the user's sketching skills 32. Whenever any sharing user wishes to authenticate, the graphical sketch-based authentication may proceed. Many details of this shared-device authentication are the same, so the similar details are only briefly reviewed.

Figure 14:
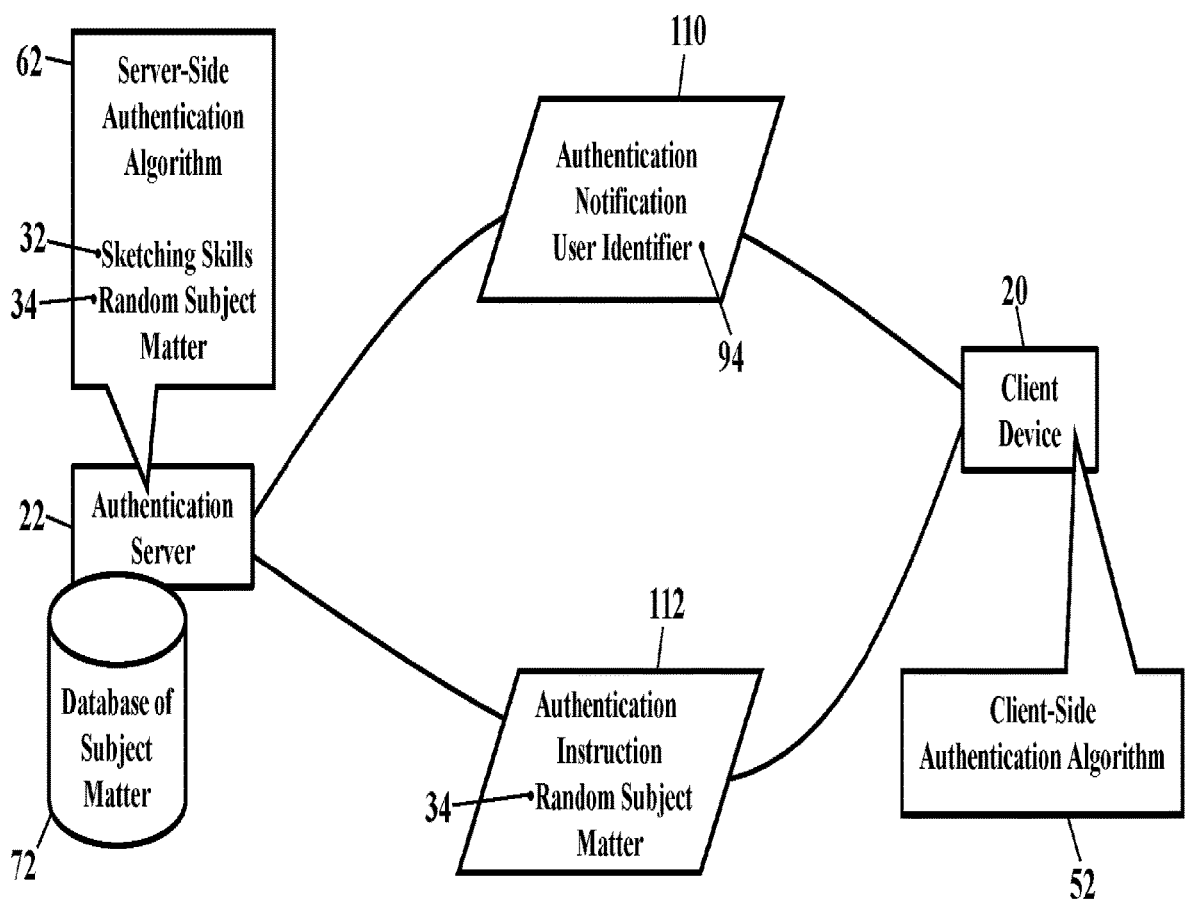

FIG. 14 thus illustrates the authentication notification 110. When one of the sharing users wishes to authenticate, the client-side authentication algorithm 52 sends the authentication notification 110 to the authentication server 22. Here, though, the authentication notification 110 includes the user identifier 94 associated with the current user of the client device 20. When the authentication server 22 receives the authentication notification 110, the server-side authentication algorithm 62 is alerted to an authentication attempt from the current user of the client device 20. The server-side authentication algorithm 62 inspects the authentication notification 110 for the user identifier 94.

The random subject matter 34 is then selected. The server-side authentication algorithm 62 queries the database 72 of subject matter for the random subject matter 34. The database 72 of subject matter randomly selects one of its entries (illustrated as reference numeral 76 from the listing 74 of nouns in FIG. 13). The database 72 of subject matter responds to the query with the random subject matter 34, and the authentication server 22 sends the authentication instruction 112 to the client device 20.

Figure 15:
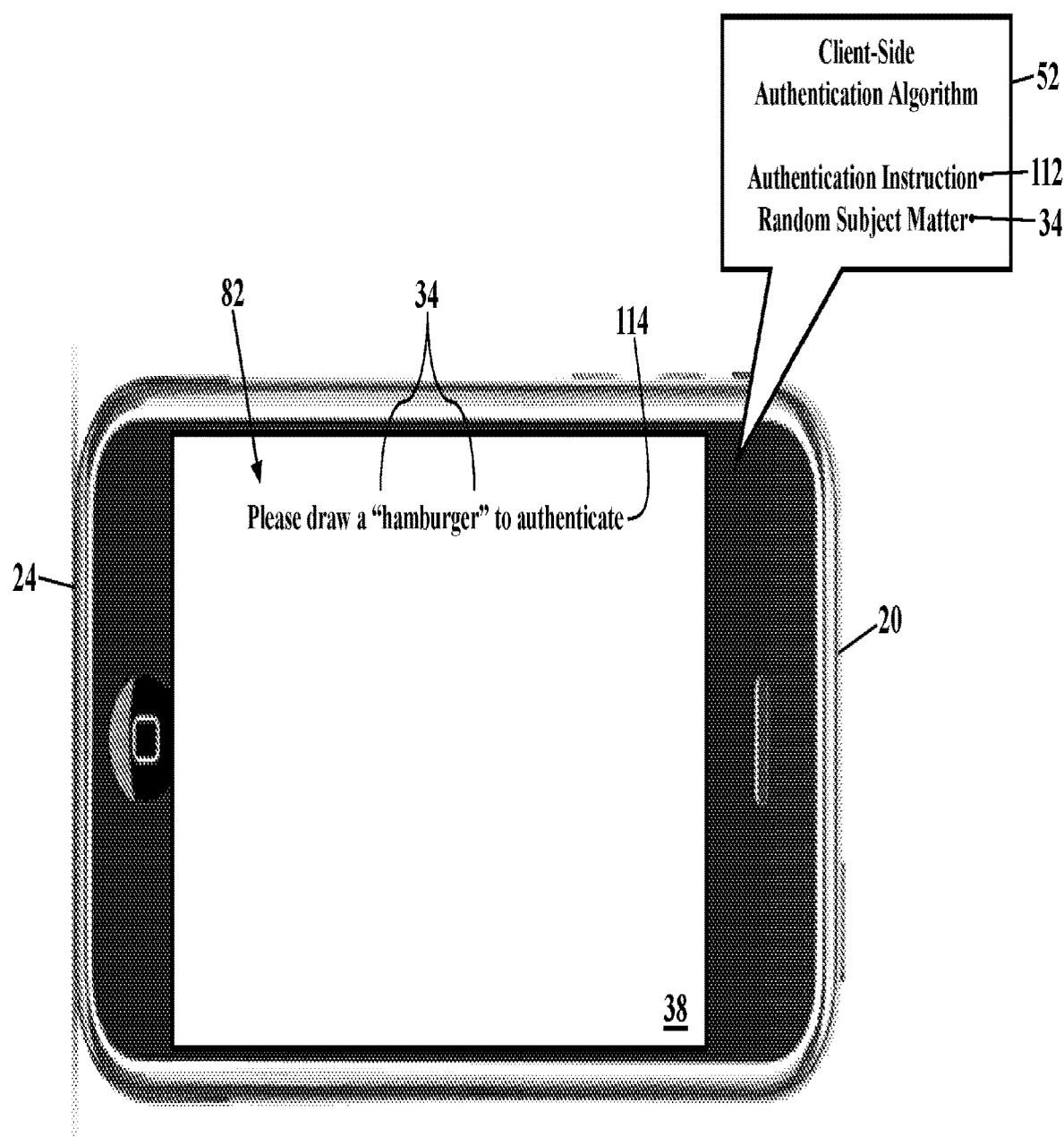

FIG. 15 illustrates the prompt 82 for the random subject matter 34. When the client device 20 receives the authentication instruction 112, the client-side authentication algorithm 52 inspects the authentication instruction 112 for the random subject matter 34. The client-side authentication algorithm 52 causes the client device 20 to generate the prompt 82 to draw the random subject matter 34. FIG. 15 again illustrates the prompt 82 produced by the touch screen 38 on the user's smart phone 24. The prompt 82 visually presents the textual version 114 of the random subject matter 34 (e.g., "Please draw a hamburger to authenticate").

Figure 16:
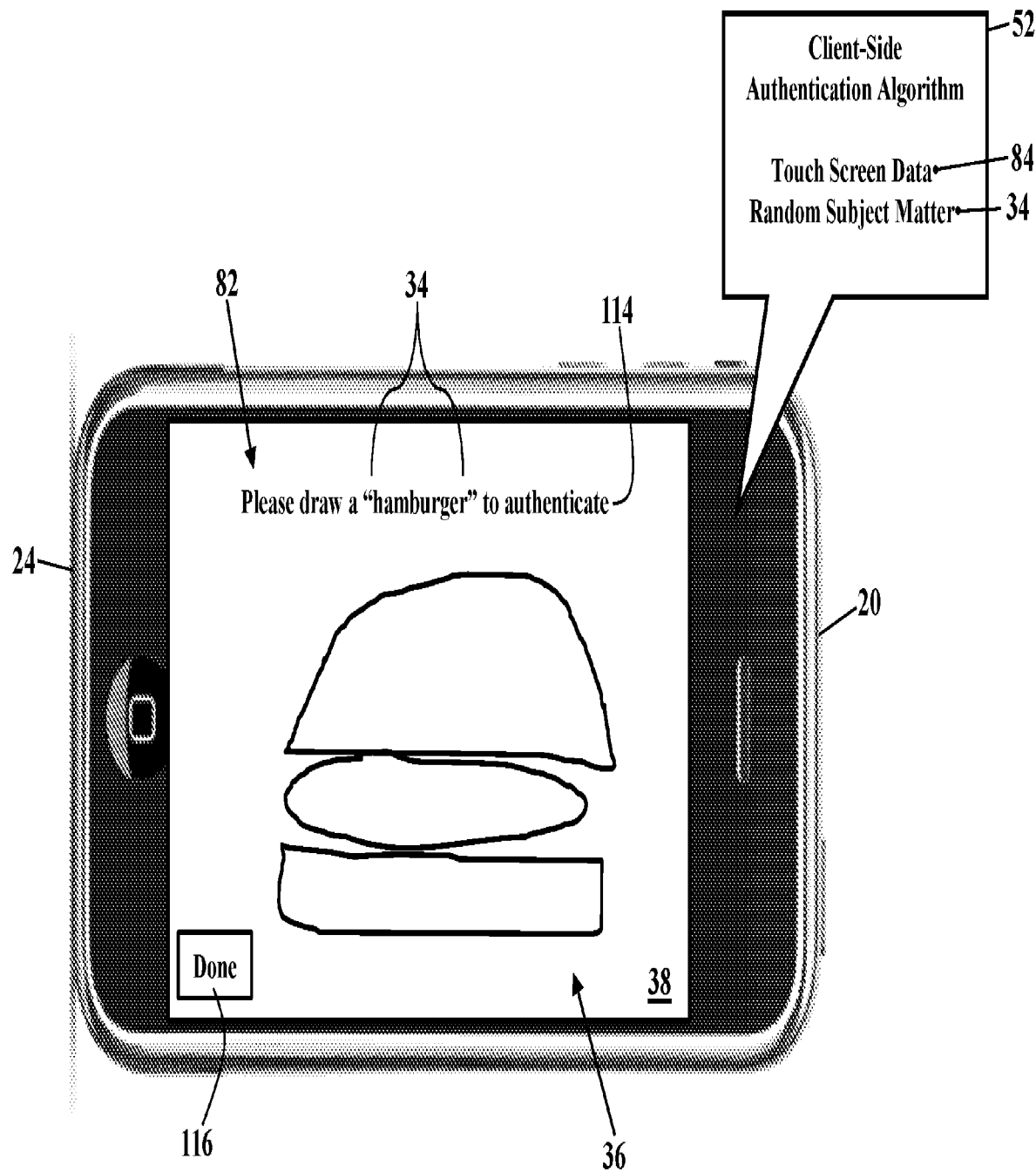

The user's sketch 36 is captured. As FIG. 16 illustrates, the user draws her version of the random subject matter 34. The client-side authentication algorithm 52 captures the user's sketch 36 as the touch screen data 84. The touch screen data 84 is stored in the memory of the client device 20.

Figure 17:
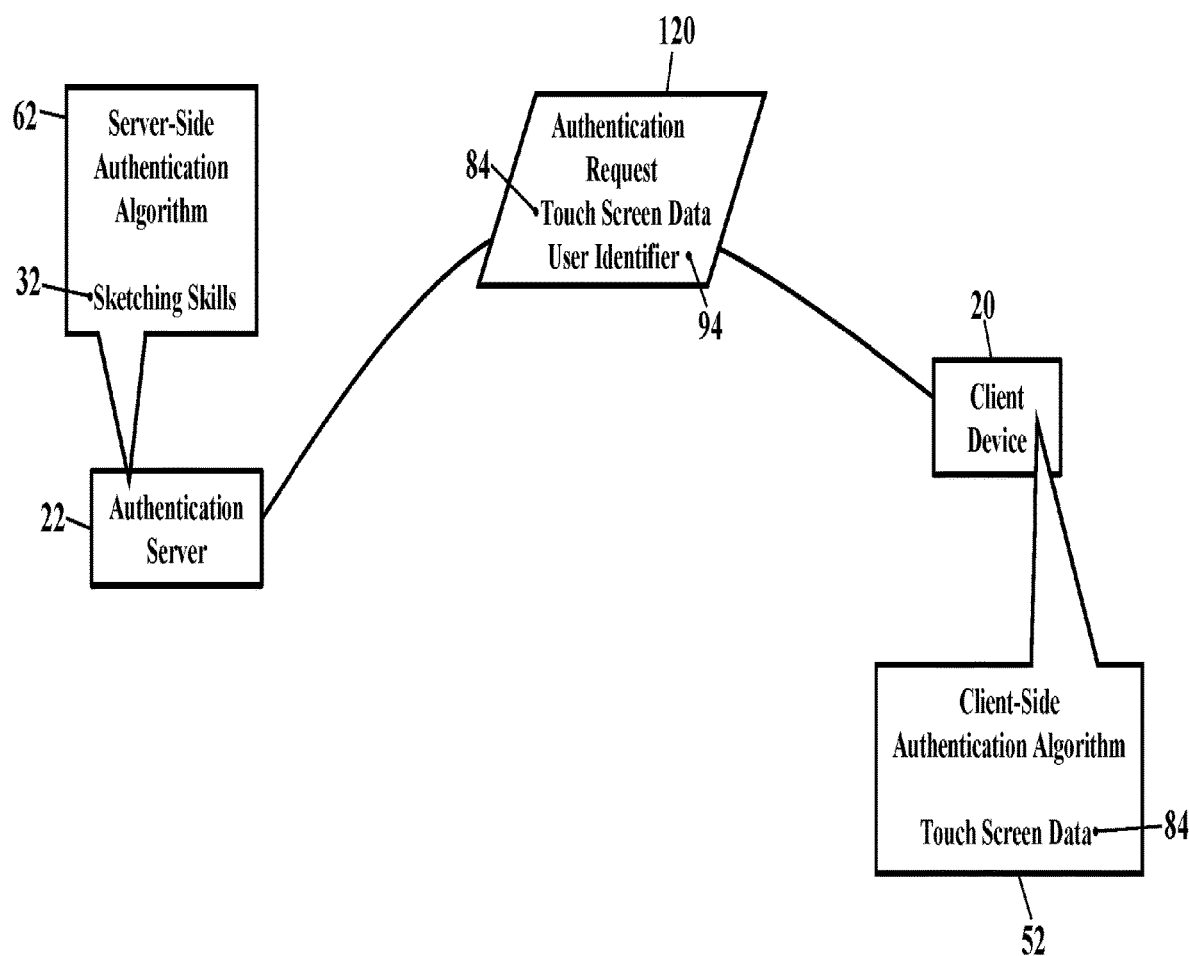

FIG. 17 illustrates the authentication request 120. Once the user's sketch 36 of the random subject matter 34 is captured, exemplary embodiments send the touch screen data 84 to the authentication server 22. The authentication request may include the touch screen data 84 and the user identifier 94 associated with the current user of the client device 20. When the authentication server 22 receives the authentication request 120, the server-side authentication algorithm 62 may now authenticate the current user of the client device 20.

Figure 18:
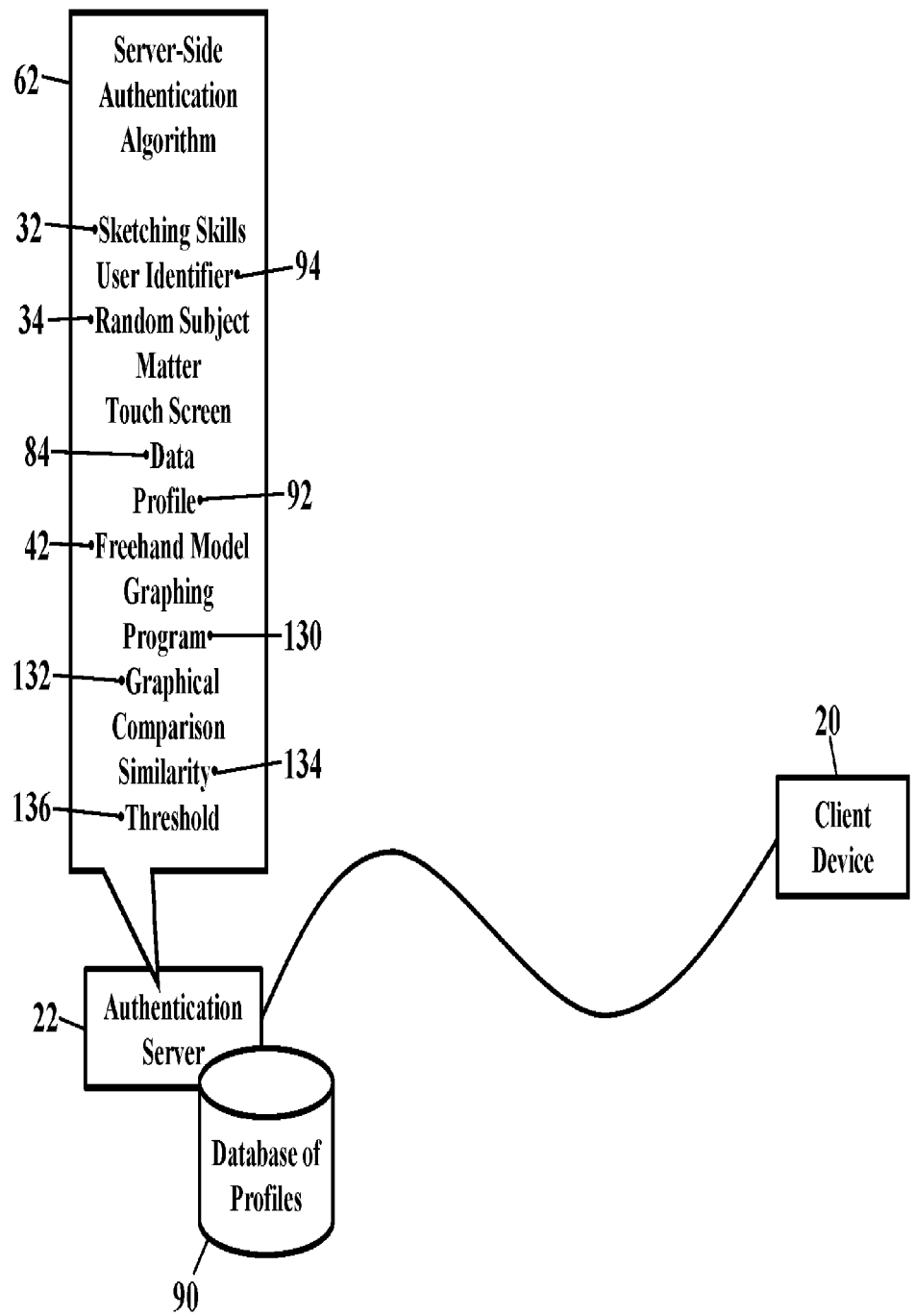

FIG. 18 illustrates the authentication. The server-side authentication algorithm 62 determines if the user's sketch 36, represented by the touch screen data 84, is truly the artistic work expected from the user identifier 94. So, the server-side authentication algorithm 62 queries the database 90 of profiles for the user identifier 94 that wishes to authenticate. The database 90 of profiles retrieves and responds with the sketching skills 32 associated with the user identifier 94.

The freehand model 42 is built. As earlier paragraphs explained, the sketching skills 32 describe the freehand sketching capabilities associated with the user identifier 94. The server-side authentication algorithm 62 may thus use the sketching skills 32 to generate the freehand model 42. The server-side authentication algorithm 62 may call or invoke the graphing program 130 that generates the freehand model 42 of the random subject matter 34, using the sketching skills 32 associated with the user identifier 94 wishing to authenticate.

The user's sketch 36 may now be compared. The server-side authentication algorithm 62 compares the touch screen data 84 to the freehand model 42 generated from the sketching skills 32 associated with the user identifier 94. The server-side authentication algorithm 62 may perform the graphical comparison 132 to determine the similarity 134 between the touch screen data 84 and the freehand model 42. If the user is truly who she logged in as (e.g., the user identifier 94), then her touch screen data 84 will sufficiently match the freehand model 42 generated from her own sketching skills 32, perhaps within the threshold 136. If her touch screen data 84 does not match the freehand model 42, then perhaps an imposter or rogue is attempting to authenticate.

Figure 19:
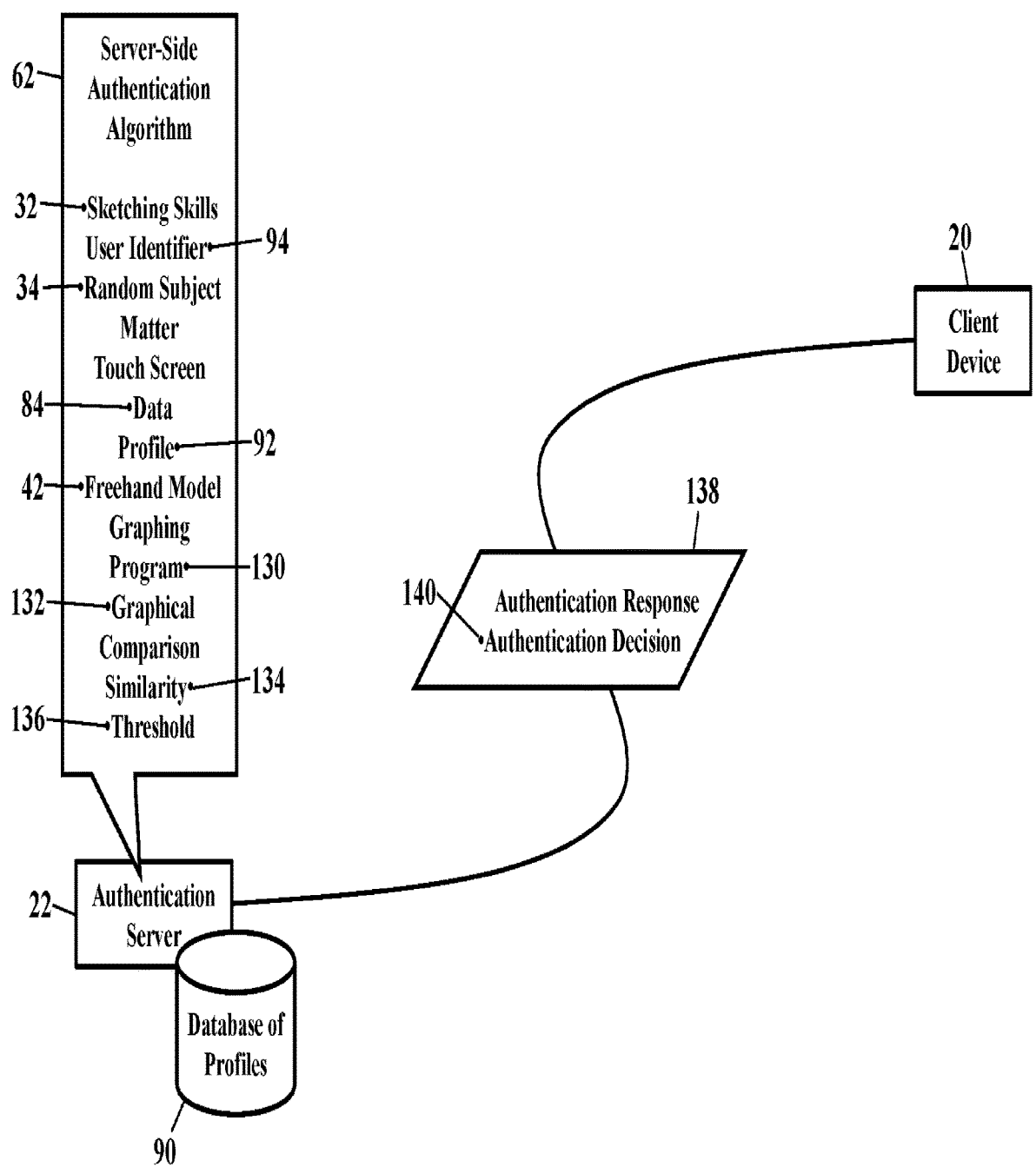

FIG. 19 illustrates the authentication response 138. Once the graphical comparison 132 is complete, the server-side authentication algorithm 62 makes the authentication decision 140. If the similarity 134 satisfied the threshold 136, then the authentication decision 140 may be the affirmation, thus allowing the client device 20 to access services and features. If the similarity 134 fails to satisfy the threshold 136, then the authentication decision 140 may be the denial. The authentication server 22 sends the authentication decision 140 as the authentication response 138. When the client device 20 receives the authentication response 138, the client-side authentication algorithm 52 also obtains the authentication decision 140. If the authentication decision 140 is the affirmation, then the client-side authentication algorithm 52 may access whatever permissions are available from the authentication server 22. If the client-side authentication algorithm 52 obtains the denial, though, then authentication failed.

Figure 20:
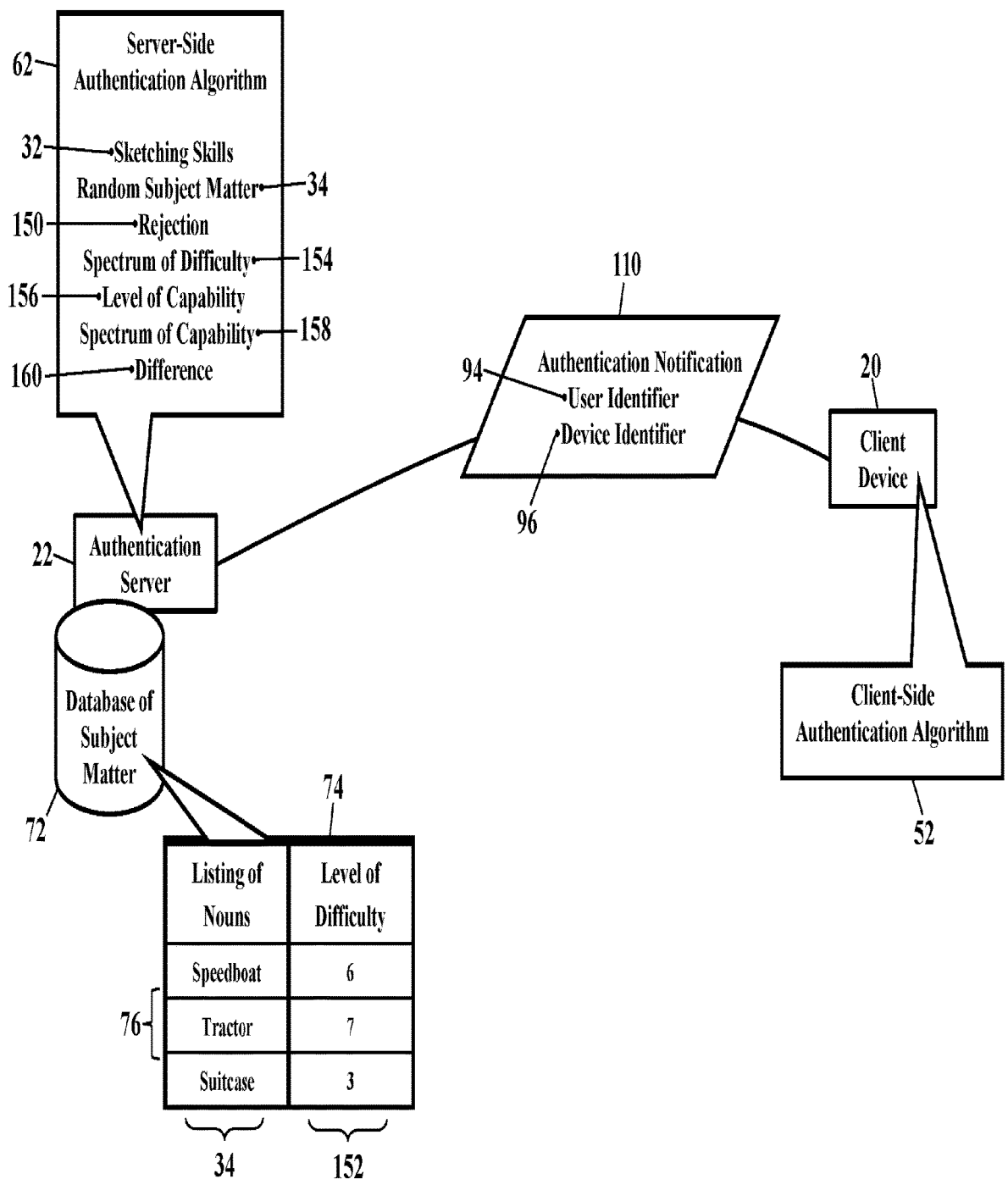
FIG. 20 is a schematic illustrating a rejection of the random subject matter, according to exemplary embodiments.

FIG. 20 is a schematic illustrating a rejection 150 of the random subject matter 34, according to exemplary embodiments. Here exemplary embodiments may determine that the random subject matter 34, selected from the database 72 of subject matter, is too complicated for the sketching skills 32 of the authenticating user. As earlier paragraphs explained, when the authentication server 22 receives the authentication notification 110 from the client device 20, the authentication server 22 is alerted to an authentication attempt by the user of the client device 20. The authentication server 22 then queries for the random subject matter 34.

Here the authentication server 22 may compare the random subject matter 34 to the sketching skills 32 of the authenticating user. As FIG. 20 illustrates, the random subject matter 34 may have an associated level 152 of difficulty. That is, each entry 76 in the database 72 of subject matter may have the associated level 152 of difficulty. Each level 152 of difficulty represents any measurement or evaluation of how hard the corresponding random subject matter 34 is to draw. Exemplary embodiments, then, may assign numerical values to different levels 152 of difficulties. Complicated subject matter, for example, may have a high level 152 of difficulty on a spectrum 154 of difficulty. Easy subject matter, though, may have a low level 152 of difficulty on the spectrum 154 of difficulty.

Each user's sketching skills 32, likewise, may also have an associated level 156 of capability. The level 156 of capability represents any measurement or evaluation of the corresponding user's ability to draw pictures. The user's sketching skills 32 may be evaluated and assigned the level 156 of capability on a spectrum 158 of capability. Exemplary embodiments, then, may assign numerical values to different levels 156 of capability. If the user's sketching skills 32 are determined to be highly capable, then the user's level 156 of capability may be highly ranked on the spectrum 158 of capability. If the user's sketching skills 32 are determined to be unskilled or incapable, then the user's level 156 of capability may be lowly ranked on the spectrum 158 of capability. Exemplary embodiments may thus compare the random subject matter 34 to the sketching skills 32 of the authenticating user.

The level 152 of difficulty may be compared to the user's level 156 of capability. If the level 152 of difficulty exceeds the user's level 156 of capability, the server-side authentication algorithm 62 may have discretion to reject or decline the random subject matter 34 retrieved from the database 72 of subject matter. The random subject matter 34 may be too complicated, or beyond the capabilities, of the authenticating user. If the random subject matter 34 is too complicated, authentication may be too inaccurate for reliable results. The server-side authentication algorithm 62 may, instead, query the database 72 of subject matter for another, second random subject matter 34. Indeed, the query may specify the user's level 156 of capability, thus instructing the database 72 of subject matter to only retrieve entries 76 having the level 152 of difficulty as less than or equal to the user's level 156 of capability.

Exemplary embodiments may also compute a difference 160. When the random subject matter 34 is retrieved from the database 72 of subject matter, the server-side authentication algorithm 62 may compute the difference 160 between the user's level 156 of capability and the level 152 of difficulty assigned to the random subject matter 34. That is, the numerical difference 160 may be computed from $$L_{Capability} - L_{Difficulty} = L_{Dif}$$

where $L_{Capability}$ denotes the user's level 156 of capability and $L_{Difficulty}$ is the level 152 of difficulty assigned to the random subject matter 34. If $L_{Dif}$ is zero (0) or positive, then the random subject matter 34 may be within the sketching skills 32 of the user. When, however, $L_{Dif}$ is negative, the random subject matter 34 may be too complicated for the sketching skills 32 of the user. Different random subject matter 34 may need to be chosen.

Figure 21:
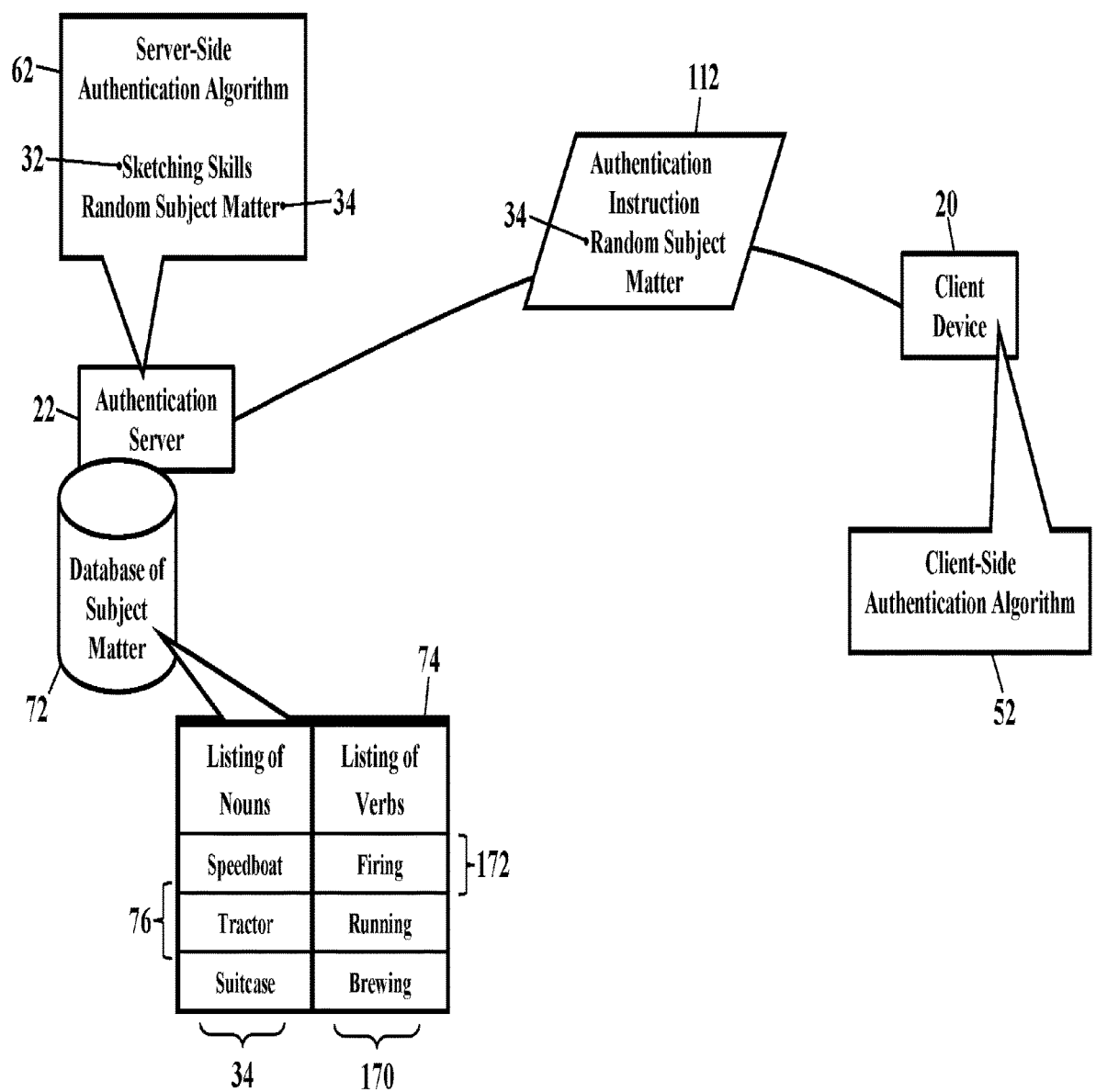
FIGS. 21-23 are schematics illustrating a database of subject matter, according to exemplary embodiments.
Figure 22:
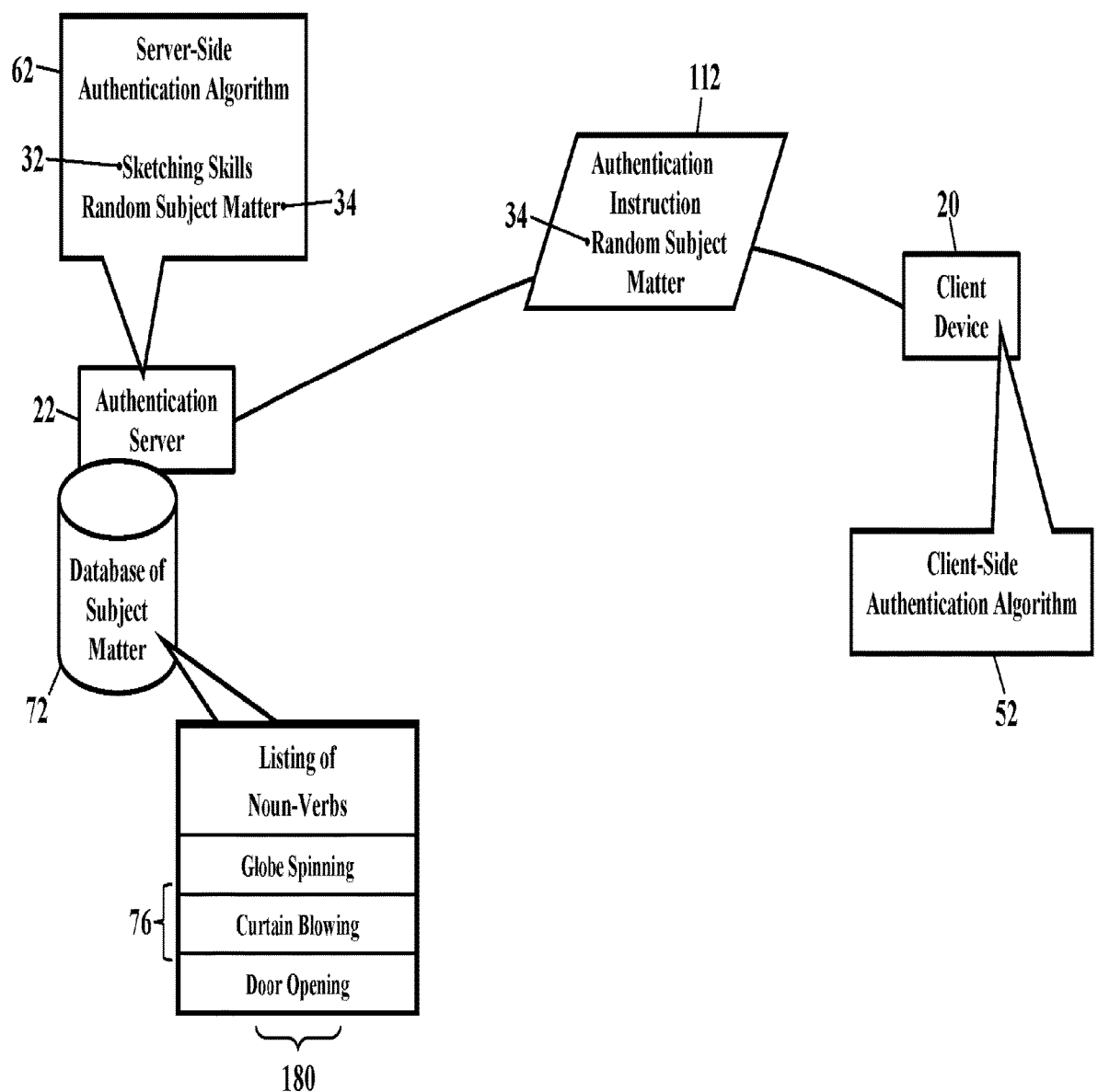

FIGS. 21-22 are schematics further illustrating the database 72 of subject matter, according to exemplary embodiments. Here the database 72 of subject matter may store the listing 74 of nouns and a listing 170 of verbs. As an earlier paragraph explained, the listing 74 of nouns may be any listing of persons, places, and/or things that the authenticating user may be required to draw. The listing 170 of verbs may be any listing of action words and/or modifiers. The listing 170 of verbs, for example, may include "running," "sleeping," "driving," and "planting." When the database 72 of subject matter is queried for the random subject matter 34, exemplary embodiments may select an entry 76 from both the listing 74 of nouns and the listing 170 of verbs. That is, the database 72 of subject matter randomly selects the entry 76 from the listing 74 of nouns and another random entry 172 from the listing 170 of verbs. The database 72 of subject matter then pairs the two randomly selected entries 76 and 172 as the random subject matter 34. As FIG. 21 illustrates, the database 72 of subject matter, for example, may retrieve "tractor" as the entry 76 from the listing 74 of nouns and "firing" as the another random entry 172 from the listing 170 of verbs. The database 72 of subject matter then pairs "tractor" and "firing" as "tractor firing" to create the random subject matter 34. The authentication instruction 112 is then sent, and the authenticating user is then prompted to draw "tractor firing," as this disclosure earlier explained.

Some pairings, however, may seem senseless. The exemplary pairing "tractor firing" may make little lexical sense. Indeed, some pairings (such as "ball sleeping" or "tree driving") may be difficult to conceptualize and draw. Still, though, exemplary embodiments may prompt the user to draw whatever pairing is selected by the database 72 of subject matter. Alternatively, exemplary embodiments may only pair noun and verb combinations that have recognized lexical usage and/or linguistic meaning. Some nouns, in other words, may only have a limited number of possible pairings with verbs that have linguistic meaning.

FIG. 22 thus illustrates predefined noun and verb pairings. Here the database 72 of subject matter may store a listing 180 of noun-verb pairings. Each entry 76 in the listing 180 of noun-verb pairings is a pre-selected noun-verb combination that is lexically or linguistically recognized. While some noun-verb pairings may have greater usage or meaning, the noun-verb pairings are chosen for authentication purposes. The database 72 of subject matter retrieves one of the noun-verb pairings as the random subject matter 34. The authenticating user is then prompted to draw the noun-verb pairing, as this disclosure earlier explained.

Figure 23:
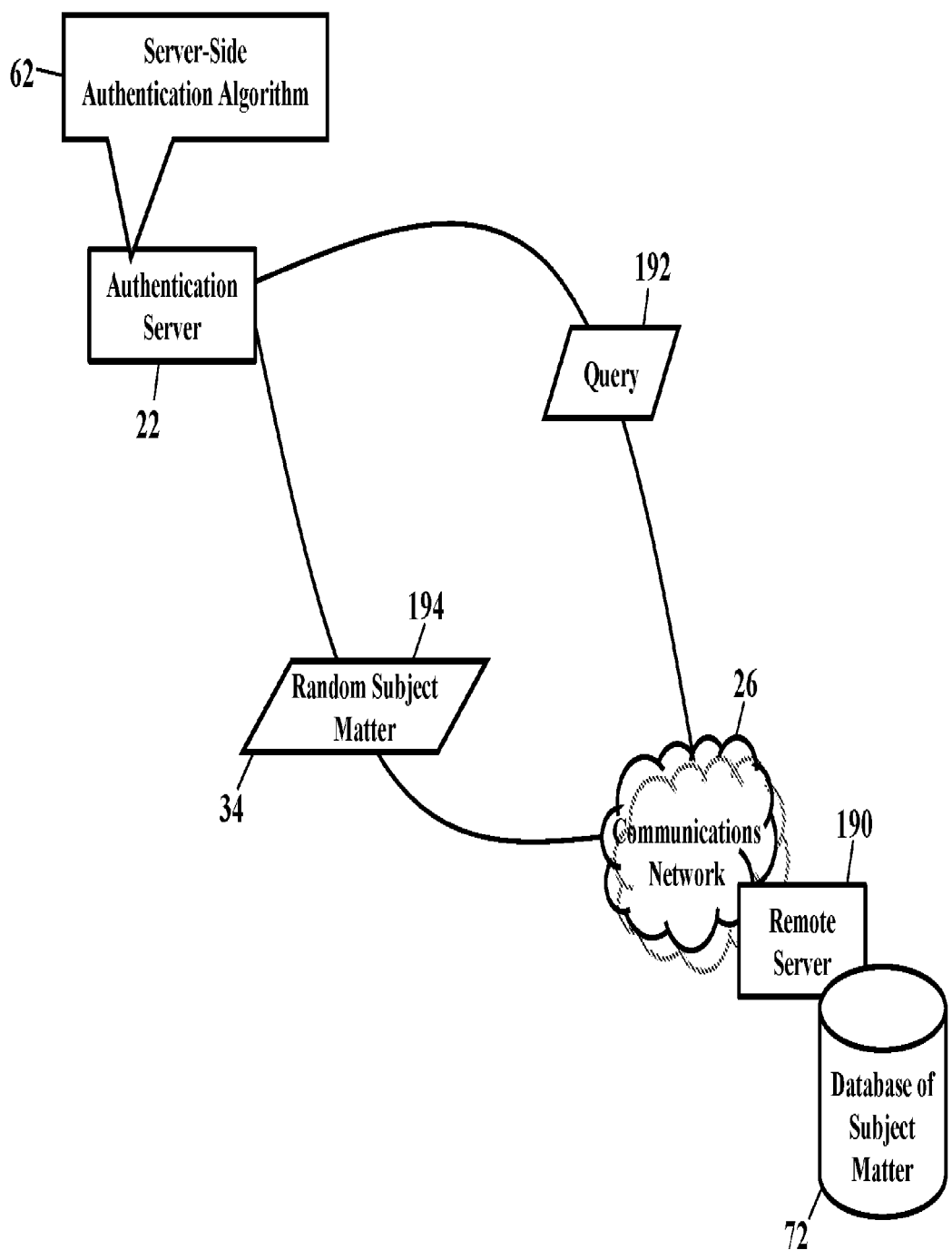

FIG. 23 is a schematic further illustrating the database 72 of subject matter, according to exemplary embodiments. Here the database 72 of subject matter may be remotely located and accessed from any location in the communications network 26. FIG. 23, for example, illustrates the database 72 of subject matter being stored in memory of a remote server 190. The remote server 190 has a microprocessor, ASIC, or other hardware component that manages queries to, and responses from, the database 72 of subject matter. When the authentication server 22 needs the random subject matter 34, the server-side authentication algorithm 62 causes the authentication server 22 to send a query 192 to the database 72 of subject matter. The query 192 routes through the communications network 26 to the network address associated with the remote server 190. The database 72 of subject matter retrieves the random subject matter 34 and sends a response 194.

Figure 24:
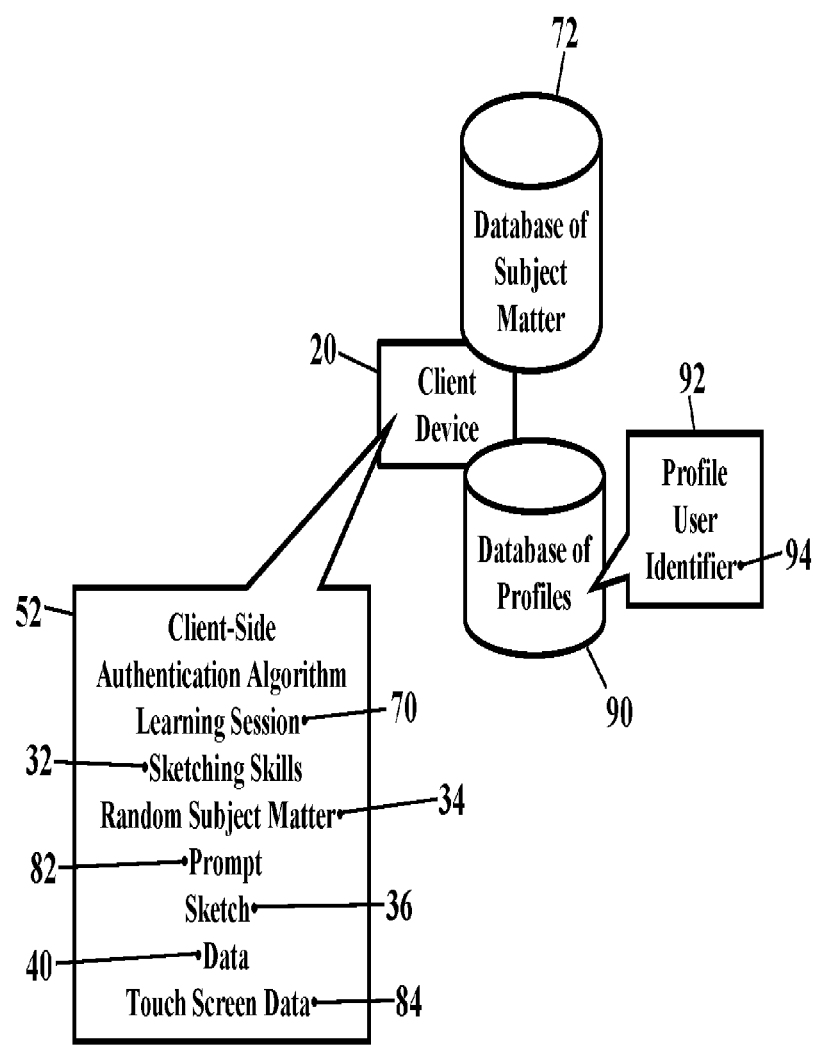
FIGS. 24-25 are schematics illustrating local authentication, according to exemplary embodiments.
Figure 25:
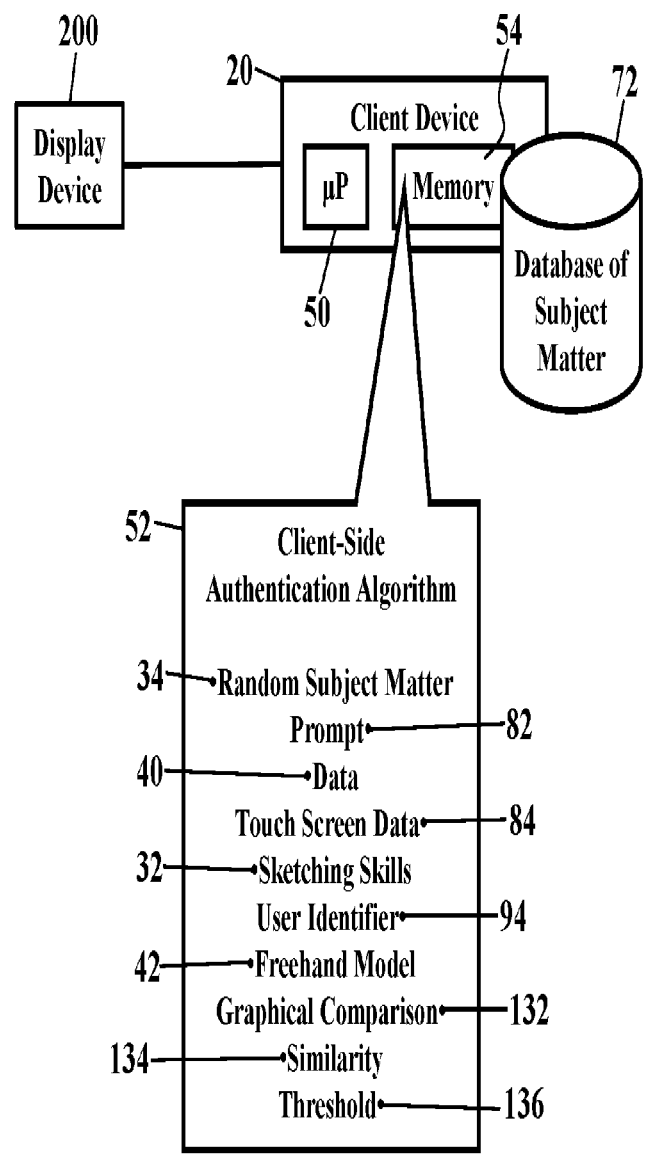

FIGS. 24-25 are schematics illustrating local authentication, according to exemplary embodiments. Earlier paragraphs explained how the client device 20 may use the remote authentication server 22 for cloud-based, authentication services. Here, exemplary embodiments include a local solution in which the client device 20 itself authenticates the user.

FIG. 24 illustrates the learning session 70. Here the client device 20 learns the user's sketching skills 32. Once again the user is repetitively prompted to draw pictures of different scenes, places, and/or things. This prompt-and-sketch routine is repeated as long as necessary until the sketching skills 32 of the user are learned. FIG. 24 illustrates the database 72 of subject matter being locally stored in the client device 20, but the database 72 of subject matter may be remotely stored and accessed (as FIG. 23 illustrated). The client-side authentication algorithm 52 recursively prompts the user to draw the random subject matter 34. The client-side authentication algorithm 52 queries the database 72 of subject matter for the random subject matter 34. The client-side authentication algorithm 52 generates the prompt 82 to draw the random subject matter 34, and the user creates the sketch 36 of the random subject matter 34. The client-side authentication algorithm 52 captures the data 40 that describes the user's sketch 36 (perhaps as the touch screen data 84).

The database 90 of profiles may also be locally stored. Once the user's sketch 36 of the random subject matter 34 is captured, the touch screen data 84 may be stored in the user's profile 92. Because the client device 20 may be shared among multiple users, each different user may establish their own profile 92. The profile 92 associates the touch screen data 84 with the user identifier 94 of the user. The client-side authentication algorithm 52 may also associate the touch screen data 84 to the random subject matter 34.

This learning session 70 repeats. The client-side authentication algorithm 52 may repeatedly retrieve different random subject matter 34 from the database 72 of subject matter. The user is prompted to draw each random subject matter 34. Each of the user's sketches 36 is captured (such as by the touch screen data 84) and stored in the user's profile 92. The user's sketch 36 may then be associated with the random subject matter 34. This cyclic learning session 70 is repeated until the user's sketching skills 32 are determined.

FIG. 25 illustrates authentication. Now that the user's sketching skills 32 are learned, the user's sketching skills 32 may be applied to authentication requests. When the current user of the client device 20 wishes to authenticate, the client-side authentication algorithm 52 queries the database 72 of subject matter for the random subject matter 34. The database 72 of subject matter selects the random subject matter 34, and the client-side authentication algorithm 52 instructs the processor 50 to generate the prompt 82. The prompt 82 is visually displayed on a display device 200 (such as the touch screen 38 of the smart phone 24, illustrated in FIG. 1), and the prompt 82 instructs the user to draw the random subject matter 34 (such as "Please draw a 'hamburger' to authenticate," as previously explained and illustrated). The user draws the random subject matter 34, and the data 40 (such as the touch screen data 84) is captured. The client-side authentication algorithm 52 retrieves the sketching skills 32 associated with the user identifier 94. The client-side authentication algorithm 52 generates the freehand model 42 of the random subject matter 34, using the sketching skills 32 associated with the user identifier 94 wishing to authenticate. The client-side authentication algorithm 52 compares the data 40 to the freehand model 42 using the graphical comparison 132. The similarity 134 is determined and compared to the threshold 136. If the similarity 134 satisfies the threshold 136, then the client-side authentication algorithm 52 may authenticate the user. If the similarity 134 does not satisfy the threshold 136, then the authentication may fail.

Exemplary embodiments may use two-dimensional and three-dimensional images. When the user is prompted to draw the random subject matter 34, exemplary embodiments may request a 2-D or 3-D rendering. If the user is prompted to draw a "house," for example, the user may be required to draw a two-dimensional "house" or a three-dimensional, isometric "house." Similarly, the freehand model 42 of the random subject matter 34 may also be generated in two-dimensions or three-dimensions.

Figure 26:
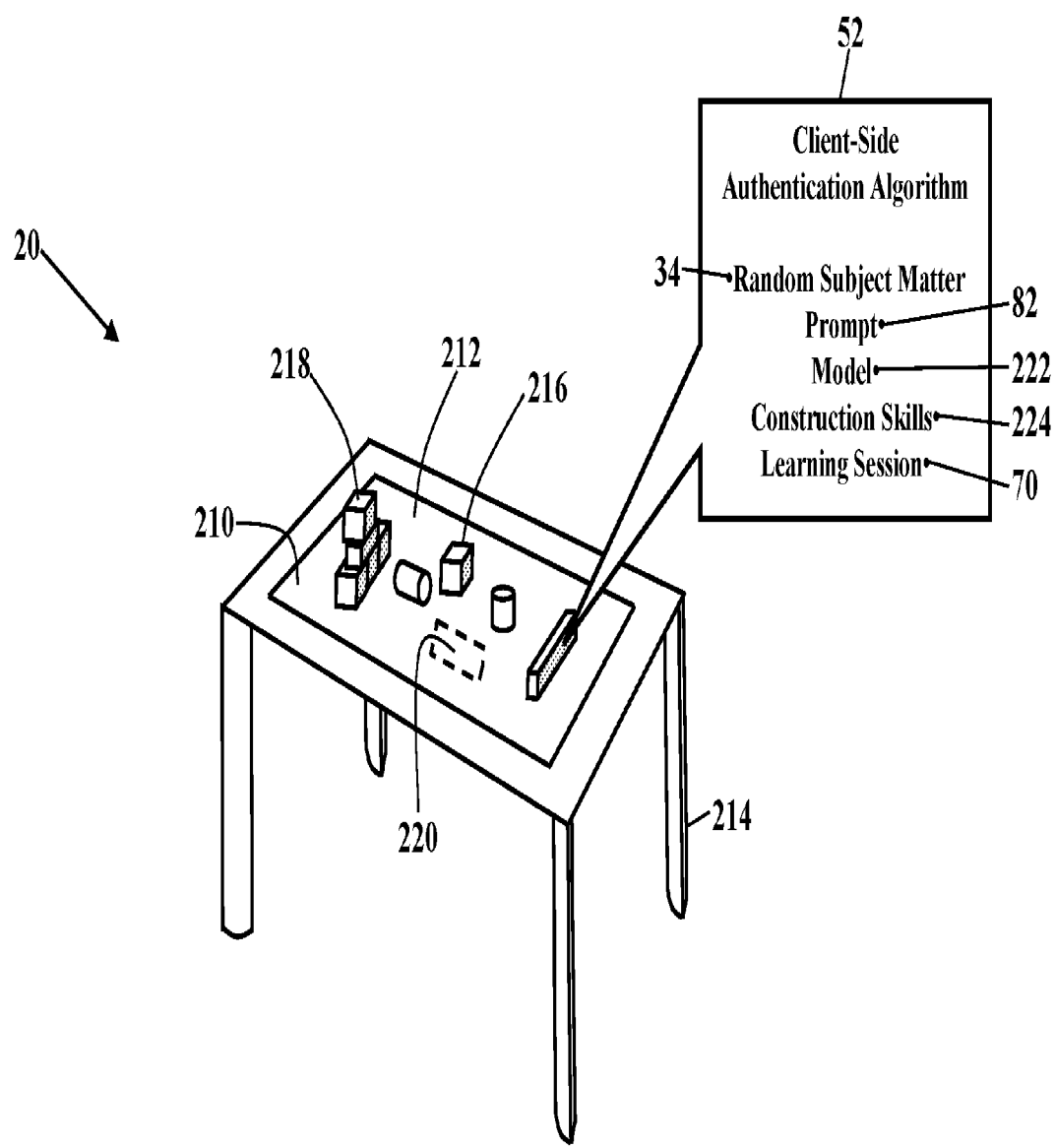
FIG. 26 is a schematic illustrating authentication using physical building blocks, according to exemplary embodiments.

FIG. 26 is a schematic illustrating authentication using physical building blocks, according to exemplary embodiments. As computing advances, the inventors foresee increased use and popularity of surface computing. Here the client device 20 is illustrated as a surface computer 210 having an interactive display 212. One or more legs 214 may support the surface computer 210, such that the interactive display 212 is generally flat or horizontal like a table. The interactive display 212, however, may have any orientation. Regardless, a designer, architect, or other user may place physical building blocks 216 onto the interactive display 212. The user arranges the building blocks 216 into a physical model 218 of any structure. The building blocks 216 may have a variety of shapes, thus allowing the user to build models of buildings, cars, component parts, or any other structure. As the user places and/or stacks the building blocks 216, an internal camera 220 peers upward through the interactive display 212 and captures digital pictures of an arrangement of the building blocks 216. The surface computer 210 analyzes the digital pictures and maps a location and identity of each building block 216. The surface computer 210 may thus create a computer model of the physical model 218 built atop the interactive display 212. Because surface computers are known to those of ordinary skill in the art, this disclosure need not provide a detailed explanation.

The physical building blocks 216 may be used for authentication. When the user wishes to authenticate, the user may be prompted to arrange the building blocks 216 into the random subject matter 34. That is, the surface computer 210 executes the client-side authentication algorithm 52 and generates the prompt 82 for the random subject matter 34 (as earlier paragraphs explained). Here, though, instead of drawing the random subject matter 34, the user arranges the building blocks 216 into the physical model 218 of the random subject matter 34. The client-side authentication algorithm 52 causes the internal camera 220 to capture a digital image of the user's physical model 218 of the random subject matter 34.

A comparison is then made. Because the user arranges the building blocks 216, here the client-side authentication algorithm 52 generates a two-dimensional or three-dimensional model 222 of the random subject matter 34. The model 222 is generated using the user's construction skills 224 learned over time. The user's construction skills 224 are learned from the learning session 70 as earlier explained, but here the user is repeatedly prompted to build two-dimensional and/or three-dimensional models of different random subject matter 34. If the authenticating user is truly who she purports to be, then exemplary embodiments may predict how she will arrange the building blocks 216 into the random subject matter 34. If the images and/or locations of the user's physical model 218 (built atop the interactive display 212) matches the model 222 generated using the user's construction skills 224, then the user may be authenticated.

Figure 27:
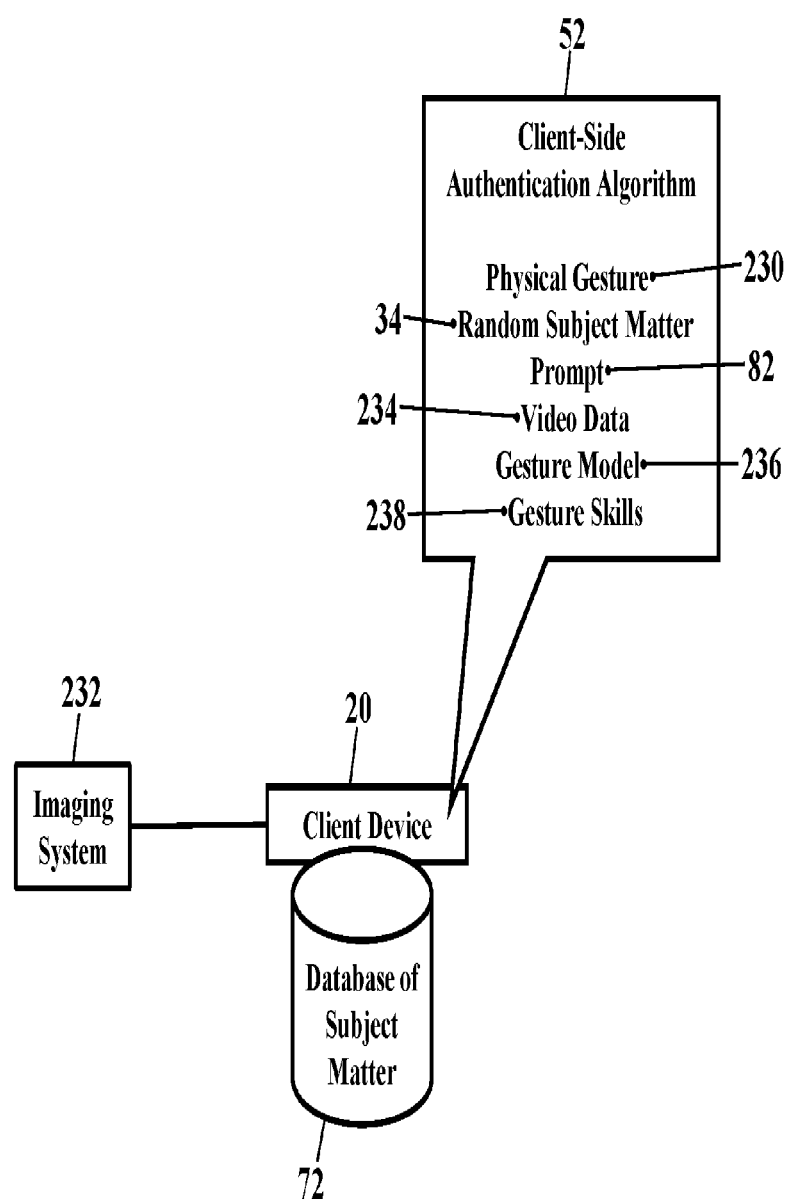
FIG. 27 is a schematic illustrating gesture-based authentication, according to exemplary embodiments.

FIG. 27 is a schematic illustrating gesture-based authentication, according to exemplary embodiments. When the user wishes to authenticate, here the user may be prompted to perform some physical gesture 230 that matches the random subject matter 34. The random subject matter 34, for example, may be "fly buzzing." The user would then be prompted (via the prompt 82) to perform the physical gesture 230 of a "fly buzzing." The client device 20 interfaces with an imaging system 232 (such as a digital camera) to capture video data 234 of the user performing her physical interpretation of a "fly buzzing." Exemplary embodiments may then compare the video data 234 to a gesture model 236 learned over time from gesture skills 238. The learning session 70, for example, may cyclically prompt the user to perform various gestures, and the user's physical interpretations are analyzed to develop the gesture skills 238. Whenever the user wishes to authenticate, the user's gesture skills 238 may be used to generate the gesture model 236 of the random subject matter 34. If the authenticating user is truly who she purports to be, then exemplary embodiments may predict how she will physically interpret the random subject matter 34. If the video data 234 matches the gesture model 236, then the user may be authenticated.

Figure 28:
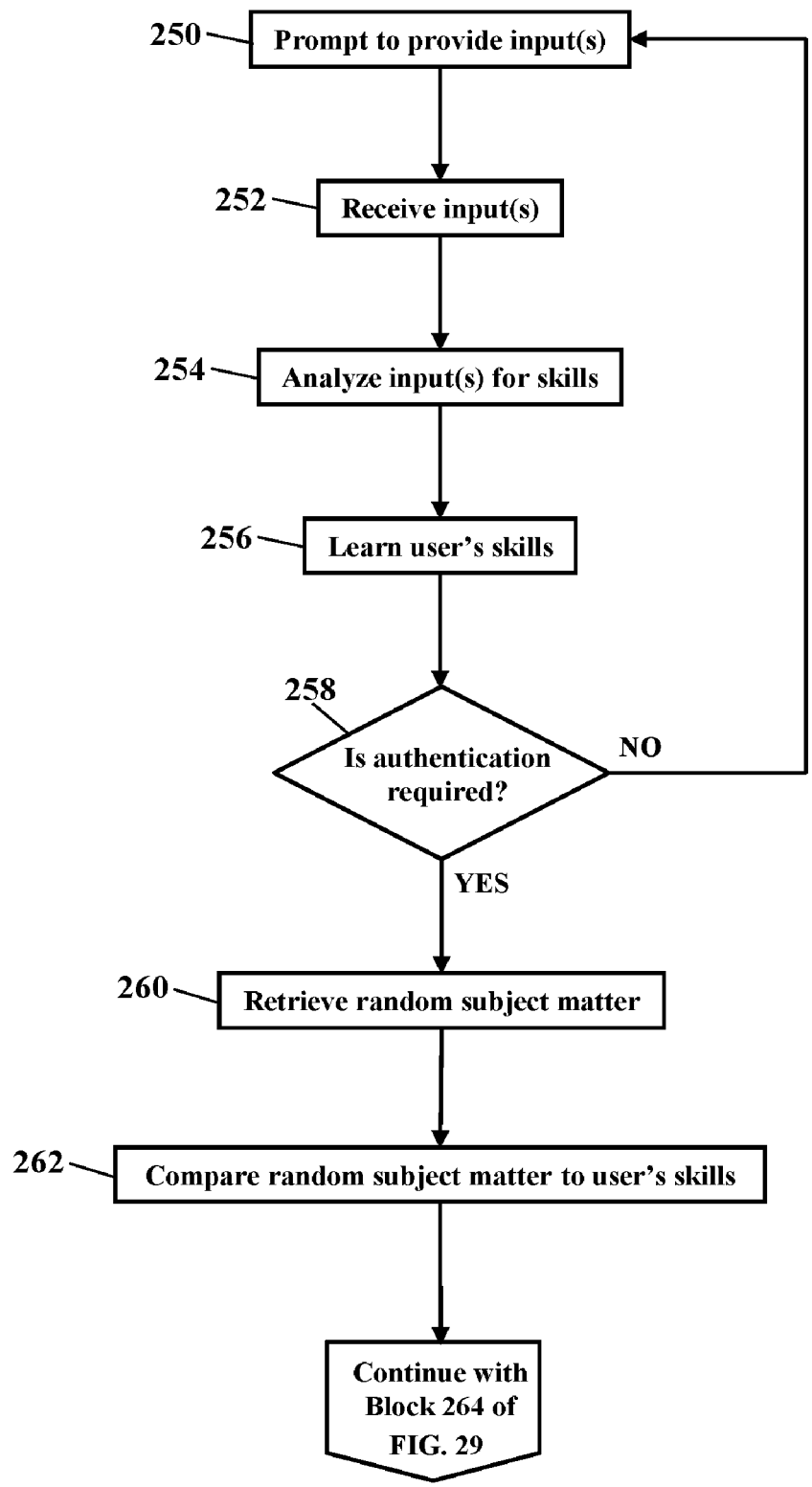
FIGS. 28-30 are flowcharts illustrating a method or algorithm for authenticating users, according to exemplary embodiments.
Figure 29:
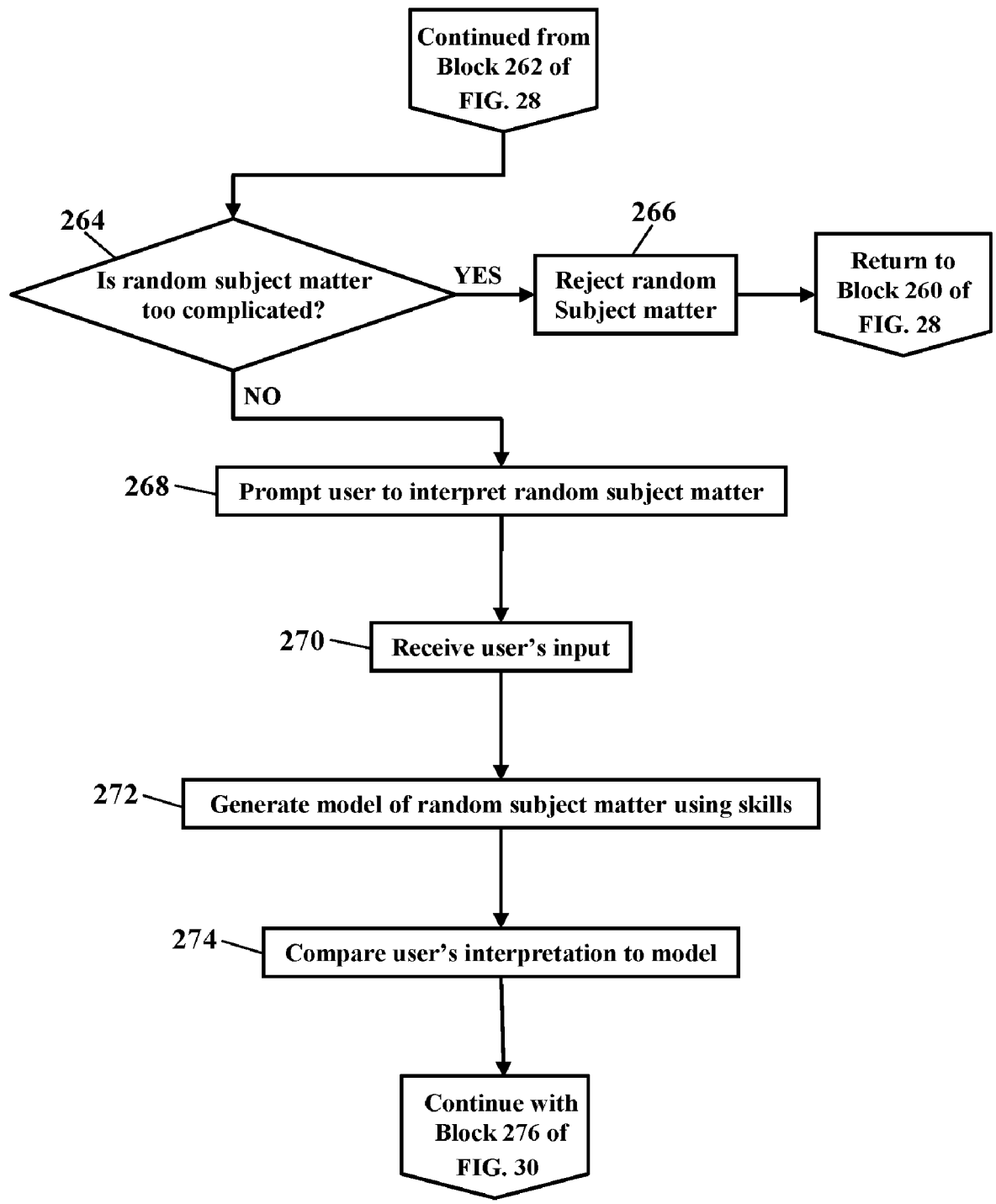
Figure 30:
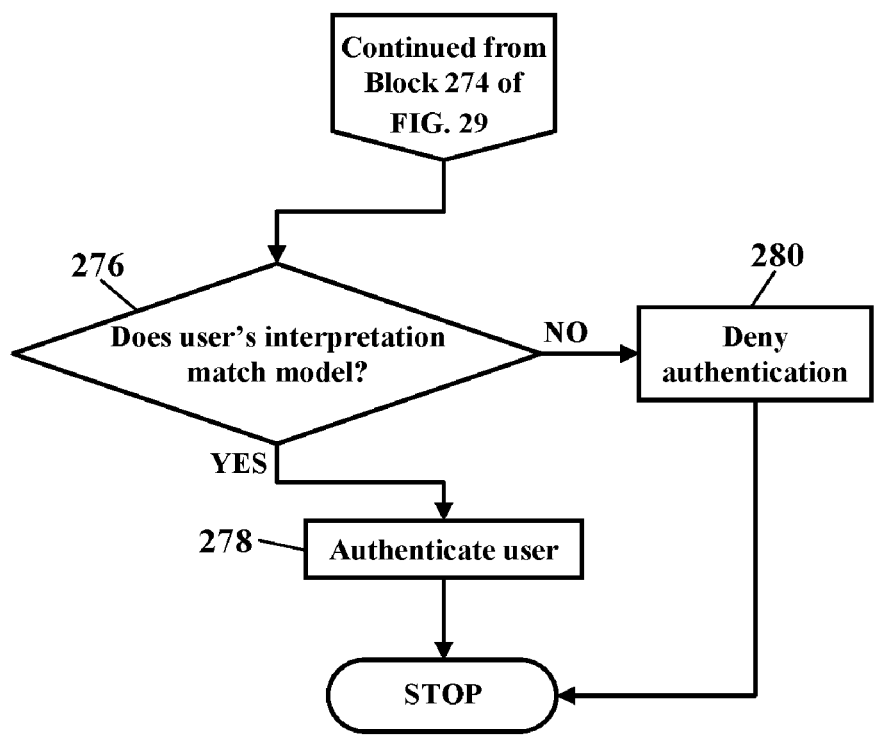

FIGS. 28-30 are flowcharts illustrating a method or algorithm for authenticating users, according to exemplary embodiments. A user is prompted to provide an input (Block 250). The user's input is received (Block 252) and analyzed for the user's skills (Block 254). This learning session 70 is repeated to learn the user's skills (Block 216). When the user wishes to authenticate (Block 258), the random subject matter 34 is retrieved (Block 260). The random subject matter 34 is compared to the user's skills (Block 262).

The algorithm continues with FIG. 29. If the random subject matter 34 is too complicated for the user's skills (Block 264), then the random subject matter 34 may be rejected (Block 266) and different subject matter is selected (see Block 260 of FIG. 28). The user is prompted to interpret the random subject matter 34 (Block 268). The user's input is received (Block 270). A model of the random subject matter 34 is generated using the skills (Block 272). The user's interpretation of the random subject matter 34 is compared to the model of the random subject matter 34 generated from the skills (Block 274).

The algorithm continues with FIG. 30. If the user's interpretation matches the model (Block 276), then the user may be authenticated (Block 278). If the user's interpretation fails to match the model (Block 276), then authentication may be denied (Block 280).

Figure 31:
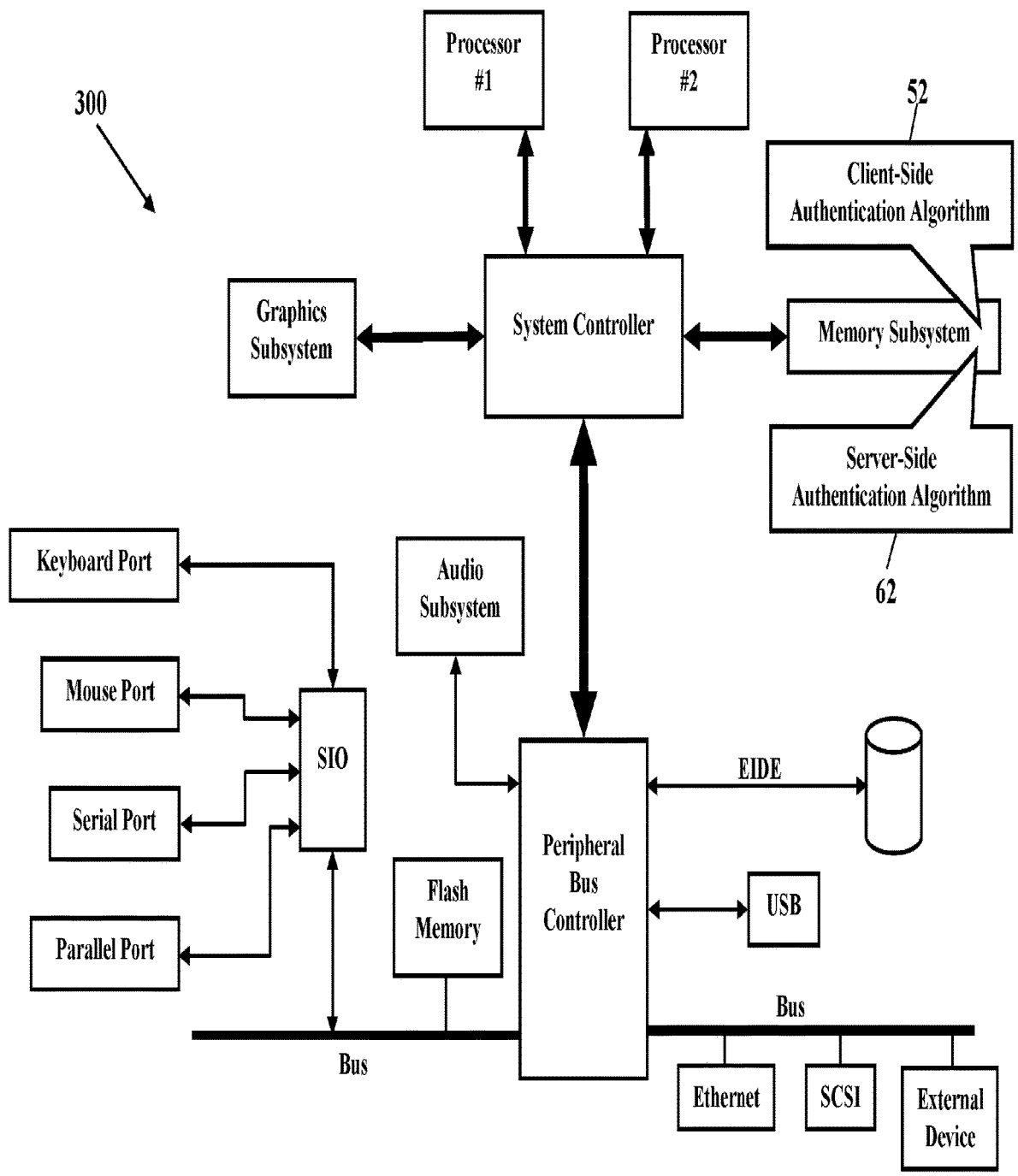
FIGS. 31-32 depict still more operating environments for additional aspects of the exemplary embodiments.

FIG. 31 is a schematic illustrating still more exemplary embodiments. FIG. 31 is a more detailed diagram illustrating a processor-controlled device 300. As earlier paragraphs explained, the client-side authentication algorithm 52 and/or the server-side authentication algorithm 62 may operate in any processor-controlled device. FIG. 31, then, illustrates the client-side authentication algorithm 52 and/or the server-side authentication algorithm 62 stored in a memory subsystem of the processor-controlled device 300. One or more processors communicate with the memory subsystem and execute either or both applications. Because the processor-controlled device 300 is well-known to those of ordinary skill in the art, no further explanation is needed.

Figure 32:
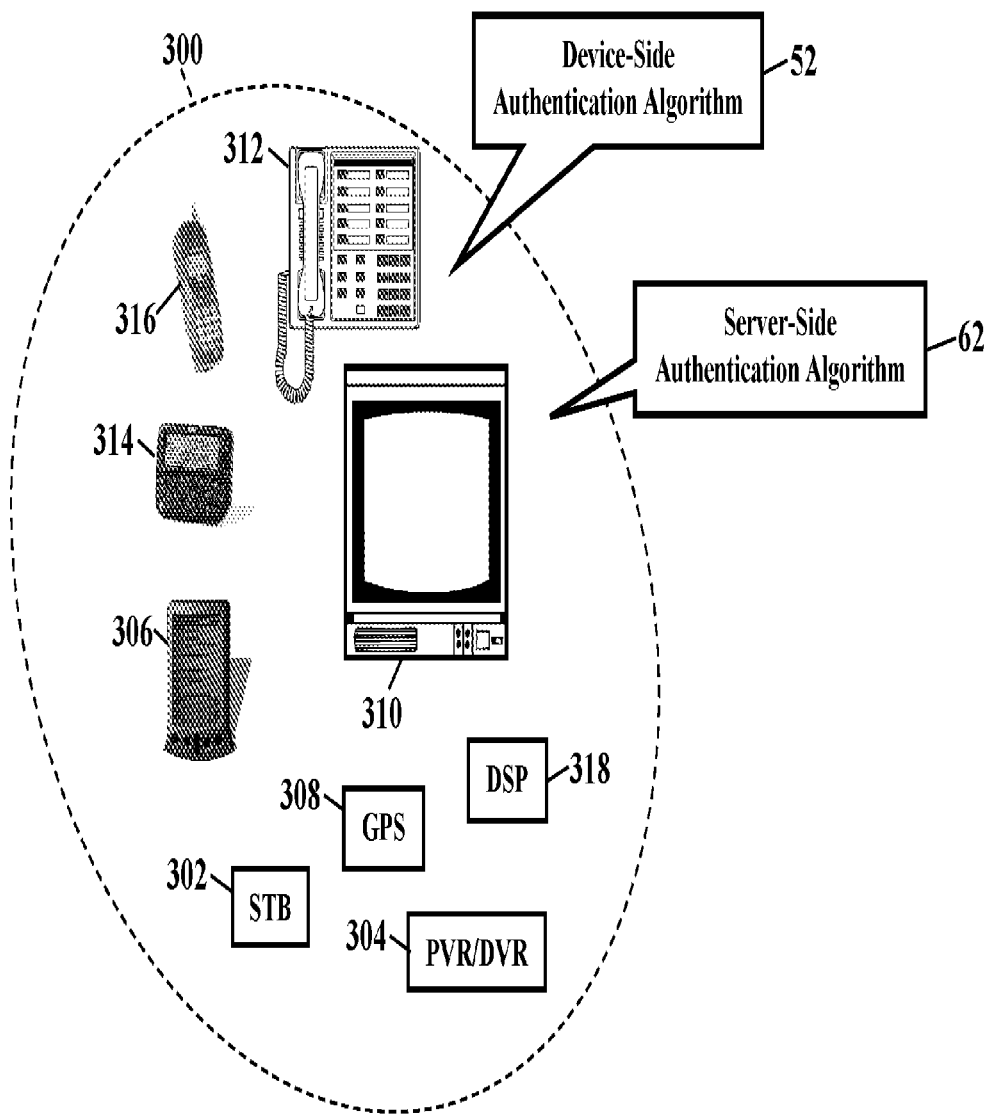

FIG. 32 depicts still more operating environments for additional aspects of the exemplary embodiments. FIG. 32 illustrates that the exemplary embodiments may alternatively or additionally operate within other processor-controlled devices 300. FIG. 32, for example, illustrates that the client-side authentication algorithm 52 and/or the server-side authentication algorithm 62 may entirely or partially operate within a set-top box ("STB") (302), a personal/digital video recorder (PVR/DVR) 304, personal digital assistant (PDA) 306, a Global Positioning System (GPS) device 308, an interactive television 310, an Internet Protocol (IP) phone 312, a pager 314, a cellular/satellite phone 316, or any computer system, communications device, or any processor-controlled device utilizing a digital signal processor (DP/DSP) 318. The processor-controlled device 300 may also include watches, radios, vehicle electronics, clocks, printers, gateways, mobile/implantable medical devices, and other apparatuses and systems. Because the architecture and operating principles of the various processor-controlled devices 300 are well known, the hardware and software componentry of the various processor-controlled devices 300 are not further shown and described.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for authenticating users, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A system, comprising:
a hardware processor; and
a memory device, the memory device storing instructions, the instructions when executed causing the hardware processor to perform operations, the operations comprising:
generating an authentication prompt for a display, the authentication prompt specifying a randomly-selected subject matter;
receiving video data representing a user performing a gesture; and
authenticating the user in response to a determination that the video data satisfies the randomly-selected subject matter.

2. The system of claim 1, wherein the operations further comprise querying a database to identify the randomly-selected subject matter.

3. The system of claim 1, wherein the operations further comprise identifying a noun representing the randomly-selected subject matter.

4. The system of claim 1, wherein the operations further comprise determining the video data fails to satisfy the randomly-selected subject matter.

5. The system of claim 4, wherein the operations further comprise denying the authenticating of the user in response to a determination that the video data fails to satisfy the randomly-selected subject matter.

6. The system of claim 1, wherein the operations further comprise randomly selecting a noun representing the randomly-selected subject matter.

7. The system of claim 1, wherein the operations further comprise comparing the video data to a predicted model.

8. A method, comprising:
generating, by a device, an authentication prompt for a display by a display device, the authentication prompt specifying a randomly-selected subject matter, wherein the randomly-selected subject matter is associated with a randomly-selected noun;
receiving, by the device, an input data generated in response to the authentication prompt, the input data representing a user performing a gesture specified by the randomly-selected subject matter;
generating, by the device, a prediction associated with the randomly-selected noun;
comparing, by the device, the input data to the randomly-selected subject matter associated with the randomly-selected noun in accordance with the prediction; and
authenticating, by the device and based on the comparing, the user in response to a determination that the input data satisfies the randomly-selected subject matter.

9. The method of claim 8, wherein the prediction includes a prediction of a physical interpretation of the randomly-selected subject matter associated with the randomly-selected noun.

10. The method of claim 8, further comprising querying a database to identify the randomly-selected noun.

11. The method of claim 8, further comprising querying a database to identify the randomly-selected subject matter associated with the randomly-selected noun.

12. The method of claim 8, further comprising denying the authenticating of the user in response to a determination that the input data fails to satisfy the randomly-selected subject matter associated with the randomly-selected noun.

13. The method of claim 8, wherein the input data includes video data.

14. The method of claim 8, wherein the randomly-selected subject matter is associated with a randomly-selected verb.

15. The method of claim 14, wherein the authentication prompt prompts the user to draw a pairing corresponding to the randomly-selected noun and the randomly-selected verb.

16. A memory device storing instructions that when executed cause a processor to perform operations, the operations comprising:
   generating an authentication prompt for a display, the authentication prompt specifying a randomly-selected subject matter;
   receiving video data representing a user performing a gesture specified by the randomly-selected subject matter; and
   authenticating the user in response to a determination that the video data satisfies the randomly-selected subject matter.

17. The memory device of claim 16, wherein the operations further comprise querying a database to identify the randomly-selected subject matter.

18. The memory device of claim 16, wherein the operations further comprise identifying a noun representing the randomly-selected subject matter.

19. The memory device of claim 16, wherein the operations further comprise:
   determining that the video data fails to satisfy the randomly-selected subject matter; and
   denying the authentication in response to the determining that the video data fails to satisfy the randomly-selected subject matter.

20. The memory device of claim 16, wherein the operations further comprise randomly selecting a noun representing the randomly-selected subject matter.

* * * * *